US008746095B2

(12) United States Patent
Isono

(10) Patent No.: US 8,746,095 B2
(45) Date of Patent: Jun. 10, 2014

(54) MOTION CONVERTER/TRANSMITTER

(75) Inventor: Hiroshi Isono, Mishima (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 1372 days.

(21) Appl. No.: 12/518,230

(22) PCT Filed: Nov. 30, 2007

(86) PCT No.: PCT/JP2007/073633
§ 371 (c)(1),
(2), (4) Date: Jun. 8, 2009

(87) PCT Pub. No.: WO2008/069295
PCT Pub. Date: Jun. 12, 2008

(65) Prior Publication Data
US 2010/0018335 A1 Jan. 28, 2010

(30) Foreign Application Priority Data
Dec. 8, 2006 (JP) ................. 2006-332449

(51) Int. Cl.
F16H 25/12 (2006.01)
F16H 25/16 (2006.01)
G05G 1/30 (2008.04)
F16H 53/00 (2006.01)
B60T 8/40 (2006.01)
B62D 1/16 (2006.01)
B60T 7/04 (2006.01)

(52) U.S. Cl.
CPC ............. B62D 1/166 (2013.01); B60T 8/409 (2013.01); B60T 8/4081 (2013.01); B60T 7/042 (2013.01); B60T 8/4086 (2013.01)
USPC ................... 74/56; 74/512; 74/567

(58) Field of Classification Search
USPC .............. 74/110, 56, 57, 512, 567
See application file for complete search history.

(56) References Cited

U.S. PATENT DOCUMENTS

| 1,331,076 A | 2/1920 | Mitchell |
| 2,415,618 A | 2/1947 | West |

(Continued)

FOREIGN PATENT DOCUMENTS

| JP | 50 107878 | 9/1975 |
| JP | 53 76263 | 7/1978 |

(Continued)

OTHER PUBLICATIONS

Office Action issued Nov. 15, 2010 in U.S. Appl. No. 12/516,213.

Primary Examiner — Justin Krause
(74) Attorney, Agent, or Firm — Oblon, Spivak, McClelland, Maier & Neustadt, L.L.P.

(57) ABSTRACT

An object of the present invention is to provide a compact motion conversion transmission apparatus which can set the transmission characteristic for motion or force as desired over a wide range. The apparatus includes input, intermediate, and output members which are fitted to one another while being aligned with an axis and move in relation to one another while being aligned with the axis. Further, the apparatus includes first transmission means which converts a first motion of the input member to a second motion and transmits the second motion to the intermediate member, the first motion being one of a rectilinear motion along the axis and a rotary motion about the axis, and the second motion being the other of the rectilinear motion along the axis and the rotary motion about the axis; and second transmission means which converts the second motion of the intermediate member to the first motion and transmits the first motion to the output member. At least one of the first transmission means and the second transmission means continuously and nonlinearly varies a ratio of an amount of motion of a motion transmission destination member to an amount of motion of a motion transmission source member according to the amount of motion of the motion transmission source member.

21 Claims, 24 Drawing Sheets

(56) References Cited

U.S. PATENT DOCUMENTS

| | | | |
|---|---|---|---|
| 2,962,911 A * | 12/1960 | Perkey et al. | 91/382 |
| 3,218,937 A * | 11/1965 | Dettlof | 91/368 |
| 3,416,582 A * | 12/1968 | Jenks | 74/127 |
| 3,477,345 A | 11/1969 | Johnson | |
| 4,192,224 A * | 3/1980 | Okamura | 92/125 |
| 4,192,244 A | 3/1980 | Kelley et al. | |
| 4,553,506 A | 11/1985 | Bekiaroglou | |
| 4,796,430 A * | 1/1989 | Malaker et al. | 62/6 |
| 6,364,046 B1 | 4/2002 | Forssell et al. | |
| 6,446,526 B2 | 9/2002 | Reimann et al. | |
| 7,290,841 B2 | 11/2007 | Isono | |
| 7,309,112 B2 | 12/2007 | Isono | |
| 7,425,042 B2 | 9/2008 | Fujiwara et al. | |
| 7,644,997 B2 | 1/2010 | Isono | |
| 7,770,472 B2 | 8/2010 | Isono et al. | |
| 7,779,629 B2 * | 8/2010 | Isono et al. | 60/413 |
| 7,950,275 B2 * | 5/2011 | Isono | 73/132 |
| 2002/0124563 A1 | 9/2002 | Ogiwara et al. | |
| 2003/0160504 A1 | 8/2003 | Chris | |
| 2005/0067798 A1 | 3/2005 | Uchiyama et al. | |
| 2005/0067885 A1 | 3/2005 | Ogiwara et al. | |
| 2005/0145057 A1 | 7/2005 | Fujiwara | |
| 2008/0003110 A1 * | 1/2008 | Isono | 417/233 |
| 2010/0064842 A1 * | 3/2010 | Isono | 74/512 |

FOREIGN PATENT DOCUMENTS

| | | |
|---|---|---|
| JP | 7 277173 | 10/1995 |
| JP | 10 138891 | 5/1998 |
| JP | 11 115699 | 4/1999 |
| JP | 2003 291825 | 10/2003 |
| JP | 2003-312467 A | 11/2003 |
| JP | 2004 210239 | 7/2004 |
| JP | 2005-53302 A | 3/2005 |
| JP | 2005 67386 | 3/2005 |
| JP | 2005 104334 | 4/2005 |
| JP | 2005-112034 A | 4/2005 |
| JP | 2005 126058 | 5/2005 |
| JP | 2005 140905 | 6/2005 |
| JP | 2005 219687 | 8/2005 |
| JP | 2006-151031 A | 6/2006 |
| JP | 2006 193012 | 7/2006 |
| JP | 2006-283823 A | 10/2006 |

* cited by examiner

MAGNITUDE OF TREADING ON BRAKE PEDAL

FORCE ACTING ON INPUT PISTON

MOTION CONVERTER/TRANSMITTER

TECHNICAL FIELD

The present invention relates to an apparatus which converts and transmits a motion and, more particularly, to a motion conversion transmission apparatus which converts a motion and transmits it at a desired transmission ratio.

BACKGROUND ART

In a brake apparatus of a vehicle, such as an automobile, when a driver depresses a brake pedal, braking operation is performed. The stroke of the brake pedal is transmitted to a piston of a master cylinder such that the piston moves over a corresponding stroke. The master cylinder converts the stroke to a braking hydraulic pressure corresponding to a treading force applied to the brake pedal, whereby a braking force corresponding to the braking hydraulic pressure is generated.

In general, a brake apparatus of a vehicle, such as an automobile desirably has a nonlinear characteristic in terms of transmission of brake pedal stroke and treading force. Conventionally, brake pedal apparatuses having different structures have been proposed so as to attain a nonlinear characteristic in terms of transmission of brake pedal stroke and treading force. For example, Japanese Patent Application Laid-Open (kokai) No. H11-115699 discloses a lever-ratio-variable-type brake pedal apparatus.

In such a lever-ratio-variable-type brake pedal apparatus, since the lever ratio is changed by means of a link mechanism including a rocking link and a connection link, a relatively large space is needed so as to allow motions of the links. Further, since the respective lengths and interrelation of the links univocally determine a change in the lever ratio, the manner in which the lever ratio changes is limited. Therefore, the transmission characteristic associated with motion or force cannot be set as desired over a wide range. Notably, the above-described problem is not limited to the lever-ratio-variable-type brake pedal apparatus, and is present in other conventional motion transmission apparatuses in which the transmission characteristic for motion or force is changed by means of an ordinary cam mechanism or the like.

DISCLOSURE OF THE INVENTION

A primary object of the present invention is to provide a compact motion conversion transmission apparatus in which motion conversion from rotary motion to rectilinear motion and motion conversion from rectilinear motion to rotary motion are effected between members aligned with an axis and fitted to each other, whereby the transmission characteristic for motion or force can be set as desired over a wide range.

The present invention provides a motion conversion transmission apparatus comprising an input member, am intermediate member, and an output member which are fitted to one another while being aligned with an axis and move in relation to one another while being aligned with the axis; first transmission means which converts a first motion of the input member to a second motion and transmits the second motion to the intermediate member, the first motion being one of a rectilinear motion along the axis and a rotary motion about the axis, and the second motion being the other of the rectilinear motion along the axis and the rotary motion about the axis; and second transmission means which converts the second motion of the intermediate member to the first motion and transmits the first motion to the output member, wherein at least one of the first transmission means and the second transmission means continuously and nonlinearly varies a ratio of an amount of motion of a motion transmission destination member to an amount of motion of a motion transmission source member according to the amount of motion of the motion transmission source member.

According to this configuration, the first motion of the input member is converted to the first motion of the output member via the second motion of the intermediate member, and the ratio of the amount of motion of the output member to the amount of motion of the input member can be varied continuously and nonlinearly according to the amount of motion of the input member. Thus, a desired continuous nonlinear characteristic can be imparted to the relation between the amount of motion of the input member and the amount of motion of the output member over the entire ranges of motions of the input member and the output member.

Further, as compared with a structure in which the input member and the output member move rectilinearly along mutually different axes and a structure in which the input member or the output member is not fitted to the intermediate member, the axial length of the motion conversion transmission apparatus can be reduced, whereby the motion conversion transmission apparatus can be rendered compact without fail.

The above-mentioned configuration may be such that: the first transmission means is configured to convert a rectilinear motion of the input member along the axis to a rotary motion about the axis, and transmit the rotary motion to the intermediate member; and the second transmission means is configured to convert the rotary motion of the intermediate member about the axis to a rectilinear motion along the axis, and transmit the rectilinear motion to the output member.

According to this configuration, it is possible to transmit the rectilinear motion of the input member to the output member as a rectilinear motion, while continuously and nonlinearly varying, without fail, the ratio of the amount of rectilinear motion of the output member to the amount of rectilinear motion of the input member according to the amount of rectilinear motion of the input member.

The above-mentioned configuration may be such that: the first transmission means is configured to convert a rotary motion of the input member about the axis to a rectilinear motion along the axis, and transmit the rectilinear motion to the intermediate member; and the second transmission means is configured to convert the rectilinear motion of the intermediate member along the axis to a rotary motion about the axis, and transmit the rotary motion to the output member.

According to this configuration, it is possible to transmit the rotary motion of the input member to the output member as a rotary motion, while continuously and nonlinearly varying, without fail, the ratio of the amount of rotary motion of the output member to the amount of rotary motion of the input member according to the amount of rotary motion of the input member.

The above-mentioned configuration may be such that: the first transmission means is configured to continuously and nonlinearly vary a ratio of an amount of motion of the intermediate member to an amount of motion of the input member according to the amount of motion of the input member, and the second transmission means is configured to continuously and nonlinearly vary a ratio of an amount of motion of the output member to the amount of motion of the intermediate member according to the amount of motion of the intermediate member.

According to this configuration, as compared with a structure in which only one of the first transmission means and the second transmission means varies the ratio between the amounts of motion continuously and nonlinearly, there can be reduced the amount of variation in the ratio between the amounts of motion to be achieved by each of the first transmission means and the second transmission means.

The above-mentioned configuration may be such that: the ratio of the amount of motion of the output member to the amount of motion of the intermediate member is larger than the ratio of the amount of motion of the intermediate member to the amount of motion of the input member.

According to this configuration, as compared with a structure in which the ratio of the amount of motion of the output member to the amount of motion of the intermediate member is smaller than the ratio of the amount of motion of the intermediate member to the amount of motion of the input member, the amount of motion of the intermediate member required to attain the same continuous nonlinear characteristic can be reduced.

The above-mentioned configuration may be such that: each of the first transmission means and the second transmission means has a cam provided on the motion transmission source member and a cam follower provided on the motion transmission destination member and engaged with the cam, and, by means of the cam follower moving to follow the cam, the ratio of the amount of motion of the motion transmission destination member to the amount of motion of the motion transmission source member is varied continuously and nonlinearly according to the amount of motion of the motion transmission source member.

According to this configuration, the ratio of the amount of motion of the motion transmission destination member to the amount of motion of the motion transmission source member can be reliably varied continuously and nonlinearly according to the amount of motion of the motion transmission source member and can exhibit a desired continuous nonlinear characteristic through setting of the cam and the cam follower.

The above-mentioned configuration may be such that: one of the cam and the cam follower is a cam groove, whereas the other of the cam and the cam follower is a cam groove engagement member which is engaged with the cam groove and moves along the cam groove, and the cam groove of at least one of the first transmission means and the second transmission means extends while being inclined with respect to a circumferential direction about the axis, and is curved such that an angle of inclination with respect to the circumferential direction varies gradually and continuously.

According to this configuration, by means of the cam groove engagement member engaged with the cam groove moving along the cam groove, the ratio of the amount of motion of the motion transmission destination member to the amount of motion of the motion transmission source member can be varied continuously and nonlinearly according to the amount of motion of the motion transmission source member and thus can exhibit a desired continuous nonlinear characteristic through setting of the shape of curve of the cam groove.

The above-mentioned configuration may be such that: the cam groove of the first transmission means and the cam groove of the second transmission means have the same angle of inclination with respect to the circumferential direction as measured at respective positions where, when the amount of motion of the input member is zero, the cam groove engagement members are engaged with the corresponding cam grooves.

According to this configuration, as compared with a structure in which the cam groove of the first transmission means and the cam groove of the second transmission means have mutually different angles of inclination with respect to the circumferential direction as measured at respective positions where the cam groove engagement members are engaged with the corresponding cam grooves when the amount of motion of the input member is zero, at the time of start and end of the rectilinear motion of the input member, the rotary motion of the intermediate member can be smoothly started and ended. Thus, the conversion of motion and the transmission of reaction force can be smoothly carried out between the input member and the intermediate member and between the intermediate member and the output member.

The above-mentioned configuration may be such that: the motion conversion transmission apparatus includes a housing for accommodating the input member, the intermediate member, and the output member therein; the intermediate member is fitted to the input member and the output member in such a manner as to surround the input member and the output member about the axis, and supports the input member and the output member in such a manner that the input member and the output member are rectilinearly movable along the axis; the housing is fitted to the intermediate member in such a manner as to surround the intermediate member about the axis, and supports the intermediate member in such a manner that the intermediate member is rotatable about the axis; the cam groove of the first transmission means and the cam groove of the second transmission means are provided on the intermediate member; the cam groove engagement member of the first transmission means and the cam groove engagement member of the second transmission means are provided on the input member and the output member, respectively; the housing has guide grooves extending along the axis; and the cam groove engagement member of the first transmission means and the cam groove engagement member of the second transmission means radially extend through the cam groove of the first transmission means and the cam groove of the second transmission means, respectively, and are engaged with the corresponding guide grooves in such a manner as to be movable along the guide grooves.

According to this configuration, as compared with a structure in which the input member and the output member move rectilinearly along mutually different axes and a structure in which the intermediate member is not fitted to the input member or the output member, the axial length of the motion conversion transmission apparatus can be reduced, whereby the motion conversion transmission apparatus can be rendered compact. Also, those members which undergo a rectilinear motion or a rotary motion can be prevented from being exposed. By means of fixing the housing to support means, the motion conversion transmission apparatus can be readily and reliably fixed to the support means.

The cam groove engagement member of the first transmission means and the cam groove engagement member of the second transmission means can be reliably guided along the axis by the guide grooves. Thus, as compared with a structure in which the housing does not have the guide grooves, the conversion of motion can be smoothly carried out between a rectilinear motion of the input member and a rotary motion of the intermediate member and between a rotary motion of the intermediate member and a rectilinear motion of the output member. Further, the housing can bear a portion of the stress imposed on the cam groove engagement members of the first and second transmission means during the conversion of motion between a rectilinear motion of the input member and a rotary motion of the intermediate member and the conversion of motion between a rotary motion of the intermediate member and a rectilinear motion of the output member. Accordingly, as compared with a structure in which the housing does not have the guide grooves, the durability of the motion conversion transmission apparatus can be improved.

The above-mentioned configuration may be such that: the first transmission means and the second transmission means are configured to rectilinearly move the output member along the axis in the same direction as that of rectilinear motion of the input member.

According to this configuration, as compared with a structure in which the output member is moved rectilinearly along the axis in a direction opposite the direction of rectilinear motion of the input member, the distance between the input member and the output member as measured when the amount of rectilinear motion of the input member is zero can be reduced. Thus, the axial length of the motion conversion transmission apparatus along the axis can be reduced.

The above-mentioned configuration may be such that: when the amount of motion of the input member is zero, the input member and the output member are in contact with each other.

According to this configuration, as compared with a structure in which, even when the amount of motion of the input member is zero, the input member and the output member are spaced apart from each other, the axial length of the motion conversion transmission apparatus can be reduced, and, when the amount of motion of the input member is zero, a shaky movement of the input member and the output member can be reliably reduced.

The above-mentioned configuration may be such that: the input member and the output member are spaced apart from each other along the axis at the same circumferential position about the axis, and the cam groove engagement member of the first transmission means and the cam groove engagement member of the second transmission means are engaged with a common guide groove.

According to this configuration, as compared with a structure in which the input member and the output member are provided at different circumferential positions about the axis, and the cam groove engagement members of the first and second transmission means are engaged with respective guide grooves, the number of guide grooves can be reduced, whereby the structure of the motion conversion transmission apparatus can be simplified.

The above-mentioned configuration may be such that: the input member and the output member have respective portions which are engaged with each other along the axis; and the first transmission means and the second transmission means are provided at the portion of the input member and the portion of the output member, respectively, and are separated from each other in a circumferential direction about the axis.

According to this configuration, as compared with a structure in which the input member and the output member do not have respective portions which are engaged with each other along the axis, and the first transmission means and the second transmission means are spaced apart from each other along the axis, the axial length of the motion conversion transmission apparatus can be reduced, whereby the motion conversion transmission apparatus can be rendered compact.

The above-mentioned configuration may be such that: the input member and the output member have respective pairs of arm portions extending along the axis toward the output member and the input member, respectively, and the paired arm portions of the input member and the paired arm portions of the output member are disposed alternately as viewed along a circumferential direction about the axis and prevent a relative rotary motion about the axis between the input member and the output member while allowing a relative rectilinear motion along the axis between the input member and the output member.

According to this configuration, a rotary reaction force which the input member receives from the intermediate member at the time of conversion of rectilinear motion of the input member to rotary motion of the intermediate member, and a rotary reaction force which the intermediate member receives from the output member at the time of conversion of rotary motion of the intermediate member to rectilinear motion of the output member, are directed opposite to each other about the axis.

Accordingly, the input member and the output member can bear at least a portion of rotary reaction force generated through conversion of motion between a rectilinear motion and a rotary motion, whereby a rotary reaction force which the first and second transmission means are to bear can be reduced. Thus, as compared with a structure in which a pair of arm portions of the input member and a pair of arm portions of the output member are not configured to prevent a relative rotary motion about the axis between the input member and the output member, the durability of the motion conversion transmission apparatus can be improved.

The above-mentioned configuration may be such that: the input member and the output member have the same shape and are disposed along the axis in an oppositely oriented relation.

According to this configuration, the input member and the output member can be of common use. Thus, as compared with a structure in which the input member and the output member are different members having different shapes, the number of types of components can be reduced, so that the cost of the motion conversion transmission apparatus can be reduced.

The above-mentioned configuration may be such that: one of the input member and the output member has a shaft portion extending along the axis toward the other of the input member and the output member, the other member has a recess which extends along the axis and receives the shaft portion in such a manner that the shaft portion is rectilinearly movable along the axis in relation to the recess, the cam groove engagement members of the first transmission means and the cam groove engagement member of the second transmission means are provided at a portion around the shaft portion and the recess and are spaced apart from each other around the axis, and the portion around the recess has a slit which allows the cam groove engagement members provided at the shaft portion to move rectilinearly along the axis in relation to the portion around the recess.

According to this configuration, as compared with a structure in which the shaft portion provided on one of the input member and the output member is not received in the recess provided in the other member in such a manner that the shaft portion and the recess are rectilinearly movable along the axis in relation to each other, a shaky movement of the input member and the output member can be reliably reduced.

Also, as compared with a structure in which the input member and the output member do not have the shaft portion and the recess, and the first and second transmission means are spaced apart from each other along the axis, the axial length of the motion conversion transmission apparatus can be reduced, whereby the motion conversion transmission apparatus can be rendered compact. Furthermore, there can be reliably prevented a problem in that the portion around the recess hinders a rectilinear motion along the axis of the cam groove engagement member in relation to the portion around the recess.

The above-mentioned configuration may be such that: the first transmission means and the second transmission means are configured to rectilinearly move the output member along the axis in a direction opposite that of rectilinear motion of the input member.

According to this configuration, the output member moves rectilinearly in a direction opposite the direction of rectilinear motion of the input member. Therefore, it is possible to transmit the rectilinear motion of the input member to the output member, while reversing the direction of the rectilinear motion.

The above-mentioned configuration may be such that: in cooperation with other members, the output member defines on its opposite sides two cylinder chambers which are filled with liquid and whose volumes are variable; the output member has an orifice for establishing communication between the two cylinder chambers; and, in association with rectilinear motion of the output member, the liquid flows from one of the two cylinder chambers to the other cylinder chamber through the orifice.

According to this configuration, a damping force associated with flow of the liquid through the orifice acts on the output member in a direction opposite that of motion of the output member. Accordingly, the higher the speed of rectilinear motion of the input member, the larger the damping force imposed on the output member. Thus, a reaction force can be generated according to the speed of rectilinear motion of the input member such that the higher the speed of rectilinear motion of the input member, the larger the reaction force.

The above-mentioned configuration may be such that: a range in which the cam groove of the first transmission means extends along the axis and a range in which the cam groove of the second transmission means extends along the axis overlap each other at least partially as viewed along a circumferential direction about the axis.

According to this configuration, as compared with a structure in which a range in which the cam groove of the first transmission means extends along the axis and a range in which the cam groove of the second transmission means extends along the axis do not overlap each other as viewed along a circumferential direction about the axis, the distance along the axis between the cam groove engagement members of the first and second transmission means can be reduced. Thus, the axial length of the motion conversion transmission apparatus can be reduced, whereby the motion conversion transmission apparatus can be rendered compact.

The above-mentioned configuration may be such that: the motion conversion transmission apparatus includes a housing for accommodating the input member, the intermediate member, and the output member therein; the input member and the output member are fitted to the intermediate member in such a manner as to surround the intermediate member about the axis, and supports the intermediate member in such a manner that the intermediate member is rectilinearly movable along the axis; the housing is fitted to the input member and the output member in such a manner as to surround the input member and the output member about the axis, and supports the input member and the output member in such a manner that the input member and the output member are rotatable about the axis; the cam groove of the first transmission means and the cam groove of the second transmission means are provided on the input member and the output member, respectively; the cam engagement member of the first transmission means and the cam engagement member of the second transmission means are provided on the intermediate member; the housing has guide grooves extending along the axis; and the cam groove engagement member of the first transmission means and the cam groove engagement member of the second transmission means radially extend through the cam groove of the first transmission means and the cam groove of the second transmission means, respectively, and are engaged with the corresponding guide grooves in such a manner as to be movable along the guide grooves.

According to this configuration, as compared with a structure in which the housing does not have the guide grooves, the conversion of motion can be smoothly carried out between a rotary motion of the input member and a rectilinear motion of the intermediate member and between a rectilinear motion of the intermediate member and a rotary motion of the output member. Further, the housing can bear a portion of the stress imposed on the cam groove engagement members of the first and second transmission means during the conversion of motion between a rotary motion of the input member and a rectilinear motion of the intermediate member and the conversion of motion between a rectilinear motion of the intermediate member and a rotary motion of the output member. Accordingly, as compared with a structure in which the housing does not have the guide grooves, the durability of the motion conversion transmission apparatus can be improved.

The above-mentioned configuration may be such that: each of the cam groove engagement members has a shaft member which is fixed to a corresponding member and extends in a radial direction, and a cam roller which is rotatably supported by the shaft member and is rollably engaged with a wall surface of the corresponding cam groove.

According to this configuration, as compared with a structure in which the cam groove engagement member is not rollably engaged with the wall surface of the cam groove, friction between the cam groove engagement member and the wall surface of the cam groove can be reduced, whereby the conversion of motion between the motion of the motion transmission source and the motion of the motion transmission destination can be smoothly carried out.

The above-mentioned configuration may be such that: each of the cam groove engagement members has a guide roller which is rotatably supported by the shaft member and is rollably engaged with a wall surface of the corresponding guide groove extending along the direction of rectilinear motion of the input member.

According to this configuration, as compared with a structure which does not have the guide rollers rollably engaged with the wall surfaces of the corresponding guide grooves, the shaft members can be reliably moved along the direction of rectilinear motion of the input member, whereby the conversion of motion between the motion of the motion transmission source and the motion of the motion transmission destination can be smoothly carried out.

The above-mentioned configuration may be such that: at least one of the first transmission means and the second transmission means is configured to continuously and nonlinearly vary the ratio of the amount of motion of a motion transmission destination member to the amount of motion of the motion transmission source member according to the amount of motion of the motion transmission source member so that the ratio of the amount of motion of the motion transmission destination member to the amount of motion of the motion transmission source member gradually increases with the amount of motion of the motion transmission source member.

The above-mentioned configuration may be such that: the first transmission means is configured to continuously and nonlinearly vary the ratio of the amount of motion of the intermediate member to the amount of motion of the input member according to the amount of motion of the input member so that the ratio of the amount of motion of the intermediate member to the amount of motion of the input member gradually increases with the amount of motion of the input member, and the second transmission means is configured to continuously and nonlinearly vary the ratio of the amount of motion of the output member to the amount of motion of the intermediate member according to the amount of motion of the intermediate member so that the ratio of the amount of motion of the output member to the amount of motion of the intermediate member gradually increases with the amount of motion of the intermediate member.

The above-mentioned configuration may be such that: a plurality of cam grooves and cam groove engagement members are provided while being spaced apart from one another at equal intervals around the axis.

The above-mentioned configuration may be such that: the rate of increase of the ratio of the amount of motion of the output member to the amount of motion of the intermediate member in association with increase of the amount of motion of the input member is higher than the rate of increase of the ratio of the amount of motion of the intermediate member to the amount of motion of the input member.

The above-mentioned configuration may be such that: the first and second transmission means are configured to rotate the output member about the axis in the same direction as the direction of rotation of the input member.

The above-mentioned configuration may be such that: the first and second transmission means are configured to rotate the output member about the axis in the direction opposite the direction of rotation of the input member.

The above-mentioned configuration may be such that: the motion conversion transmission apparatus is configured to transmit a motion of operation means operated by an operator to another member.

The above-mentioned configuration may be such that: the motion conversion transmission apparatus is disposed between brake operation means operated by a driver of a vehicle and means for converting an operating force applied to the brake operation means to a hydraulic pressure.

The above-mentioned configuration may be such that: the motion conversion transmission apparatus is disposed between a vehicle body and a member which moves up and down together with a wheel, and the input member and the output member are connected to spring seats that support a suspension spring.

The above-mentioned configuration may be such that: the motion conversion transmission apparatus is disposed between a steering wheel of a steering apparatus of a vehicle and a motion conversion mechanism that converts a rotary motion to a steering motion of steerable wheels.

BEST MODE FOR CARRYING OUT THE INVENTION

Several preferred embodiments of the present invention will next be described in detail with reference to the appended drawings.

Before description of the embodiments, with reference to FIG. 12, a brake apparatus for a vehicle such as an automobile will be described as an application example to which first through fifth embodiments (to be described later) of the motion conversion transmission apparatus according to the present invention and configured as a brake stroke simulator can be applied.

Figure 12:
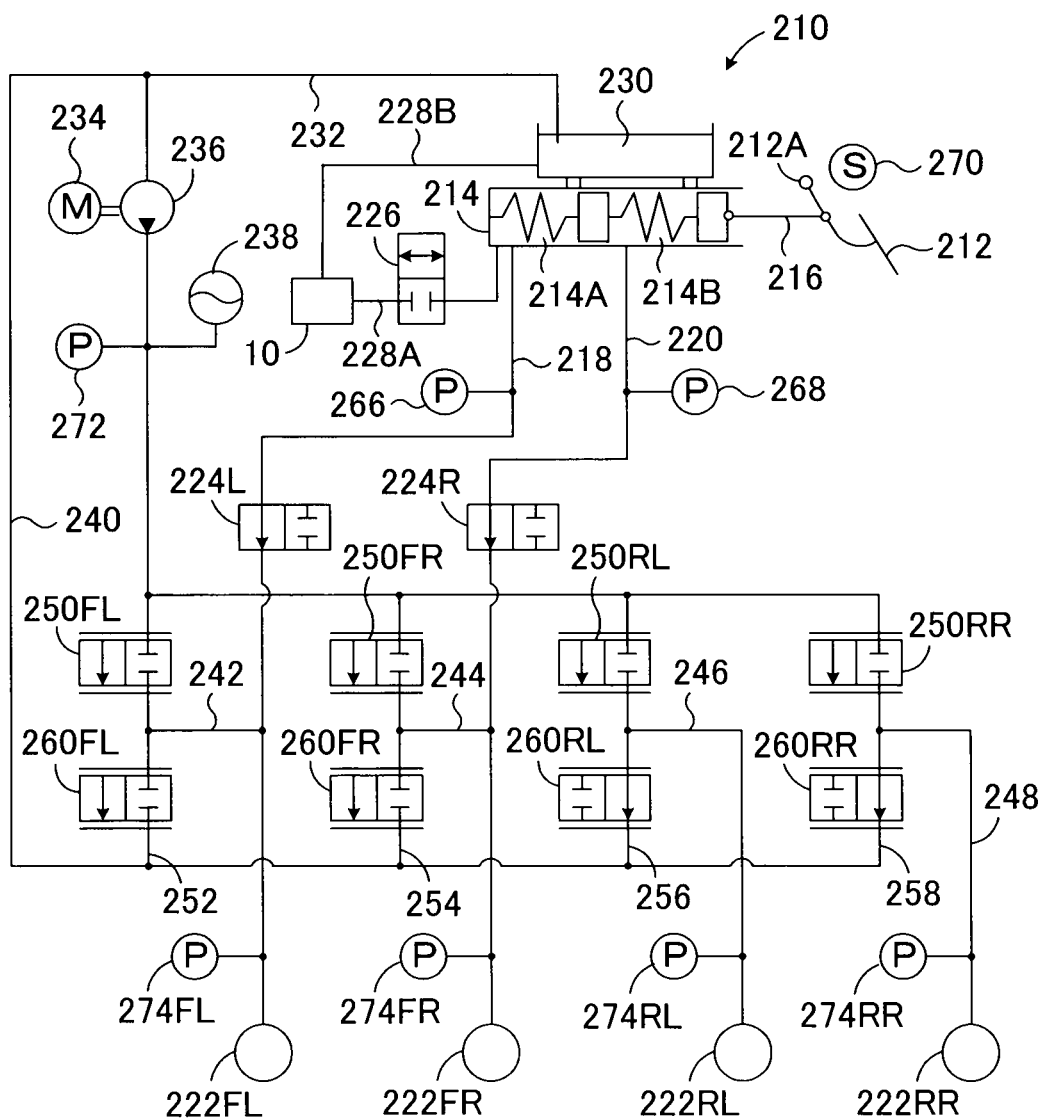
FIG. 12 is a schematic diagram showing a hydraulic brake apparatus which is one application example and to which the embodiments of the brake stroke simulator can be applied.

FIG. 12 shows a hydraulic brake apparatus 210, which is one application example and to which the embodiments of the brake stroke simulator can be applied. The brake apparatus 210 includes a master cylinder 214 which feeds brake oil under pressure in response to a driver's operation of treading on a brake pedal 212. The brake pedal 212 is pivotably supported by a pivot shaft 212A, and is connected to a piston of the master cylinder 214 via an operation rod 216.

The master cylinder 214 includes a first master cylinder chamber 214A and a second master cylinder chamber 214B. First ends of a brake oil pressure control pipe 218 for a front left wheel and a brake oil supply pipe 220 for a front right wheel are connected to these master cylinder chambers, respectively. Wheel cylinders 222FL and 222FR for controlling braking forces of the front left wheel and the front right wheel are connected to second ends of the brake oil pressure control pipes 218 and 220.

Normally-open-type solenoid on-off valves (so-called master cut valves) 224L and 224R, each of which functions as a communication control valve, are provided in the brake oil supply pipes 218 and 220, respectively. The solenoid on-off valve 224L functions as a shut-off valve which controls communication between the first master cylinder chamber 214A and the corresponding wheel cylinder 222FL. Similarly, the solenoid on-off valve 224R functions as a shut-off valve which controls communication between the second master cylinder chamber 214B and the corresponding wheel cylinder 222FR. Further, a brake stroke simulator 10 configured according to the present invention is connected to the first master cylinder chamber 214A via a pipe 228A with a normally-closed-type solenoid on-off valve (normally-closed valve) 226 provided therein.

A reservoir 230 is connected to the master cylinder 214, and one end of an oil supply pipe 232 is connected to the reservoir 230. An oil pump 236 driven by a motor 234 is provided in the oil supply pipe 232. An accumulator 238 for accumulating high pressure oil is connected to a portion of the oil supply pipe 232 located on the discharge side of the oil pump 236. One end of an oil drain pipe 240 is connected to a portion of the oil supply pipe 232 located between the reservoir 230 and the oil pump 236. The reservoir 230, the oil pump 236, the accumulator 238, etc. function as a high-pressure pressure source for increasing pressures within the wheel cylinders 222FL and 222FR, as well as within wheel cylinders 222RL and 222RR, as will be described later.

Although not shown in FIG. 12, a pipe is provided so as to connect together the portions of the oil supply pipe 232 located on the suction side and discharge side, respectively, of the oil pump 236, and a relief valve is provided in the pipe. When the pressure within the accumulator 238 exceeds a reference value, the relief valve opens so as to return oil from the discharge side portion of the oil supply pipe 232 to the suction side portion of the oil supply pipe 232.

The portion of the oil supply pipe 232 located on the discharge side of the oil pump 236 is connected to a portion of the brake oil supply pipe 218 located between the solenoid on-off valve 224L and the wheel cylinder 222FL via an oil pressure control pipe 242, is connected to a portion of the brake oil supply pipe 220 located between the solenoid on-off valve 224R and the wheel cylinder 222FR via an oil pressure control pipe 244, is connected to the wheel cylinder 222RL for a rear left wheel via an oil pressure control pipe 246, and is connected to the wheel cylinder 222RR for a rear right wheel via an oil pressure control pipe 248.

Normally-closed-type solenoid linear valves 250FL, 250FR, 250RL, and 250RR are provided in the oil pressure control pipes 242, 244, 246, and 248, respectively. Respective portions of the oil pressure control pipes 242, 244, 246, and 248 located on the side toward the wheel cylinders 222FL, 222FR, 222RL, and 222RR with respect to the linear valves 250FL, 250FR, 250RL, and 250RR are connected to the oil drain pipe 240 via oil pressure control pipes 252, 254, 256, and 258, respectively. Normally-close-type solenoid linear valves 260FL and 260FR are provided in the oil pressure control pipes 252 and 254, respectively, and normally-open-type solenoid linear valves 260RL and 260RR, which are less expensive than normally-closed-type solenoid linear valves, are provided in the oil pressure control pipes 256 and 258, respectively.

The linear valves 250FL, 250FR, 250RL, and 250RR function as pressure increase valves (maintaining valves) for the wheel cylinders 222FL, 222FR, 222RL, and 222RR, respectively. The linear valves 260FL, 260FR, 260RL, and 260RR function as pressure decrease valves for the wheel cylinders 222FL, 222FR, 222RL, and 222RR, respectively. Accordingly, these linear valves cooperatively constitute pressure increase/decrease control valves which control supply of high-pressure oil from the accumulator 238 to the respective wheel cylinders and drain of oil therefrom.

During uncontrolled periods in which drive current is not supplied to the linear valves and the motor 234, the solenoid on-off valves 224L and 224R are each maintained in an opened state; the solenoid on-off valve 226, the linear valves 250FL to 250RR, and the linear valves 260FL and 260FR are each maintained in a closed state; and the linear valves 260RL and 260RR are each maintained in an opened state (uncontrolled mode). Thus, the pressures within the wheel cylinders of the left and right front wheels are directly controlled by the master cylinder 214.

As shown in FIG. 12, a first pressure sensor 266 is provided in the portion of the brake oil pressure control pipe 218 between the first master cylinder chamber 214A and the solenoid on-off valve 224L so as to detect the pressure within the control pipe as a first master cylinder pressure Pm1. Similarly, a second pressure sensor 268 is provided in the portion of the brake oil pressure control pipe 220 between the second master cylinder chamber 214B and the solenoid on-off valve 224R so as to detect the pressure within the control pipe as a second master cylinder pressure Pm2. A stroke sensor 270 is provided for the bake pedal 212 so as to detect a stroke St of driver's treading on the brake pedal. A pressure sensor 272 is provided in the portion of the oil supply pipe 232 located on the discharge side of the oil pump 234 so as to detect the pressure within the pipe as an accumulator pressure Pa.

Pressure sensors 274FL and 274FR are provided in the respective portions of the brake oil supply pipes 218 and 220 located between the solenoid on-off valve 224L and the wheel cylinder 222FL and between the solenoid on-off valve 224R and the wheel cylinder 222FR, respectively, so as to detect the pressures within the corresponding pipes, as pressures Pfl and Pfr within the wheel cylinders 222FL and 222FR, respectively. Further, pressure sensors 274RL and 274RR are provided in the respective portions of the oil pressure control pipes 246 and 248 located between the solenoid on-off valve 250RL and the wheel cylinder 222RL and between the solenoid on-off valve 250RR and the wheel cylinder 222RR, respectively, so as to detect the pressures within the corresponding pipes, as pressures Prl and Prr within the wheel cylinders 222RL and 222RR, respectively.

The solenoid on-off valves 224L and 224R, the solenoid on-off valve 226, the motor 234, the linear valves 250FL to 250RR, and the linear valves 260FL to 260RR are controlled by means of an electronic control apparatus not shown in FIG. 12.

The electronic control apparatus receives signals representing the first master cylinder pressure Pm1 and the second master cylinder pressure Pm2 from the pressure sensors 266 and 268, respectively; a signal representing the stroke St of treading on the brake pedal 212 from the stroke sensor 270; a signal representing the accumulator pressure Pa from the pressure sensor 272; and signals representing the pressures Pi (i=fl, fr, rl, rr) within the wheel cylinders 222FL to 222RR from the pressure sensors 274FL to 274RR, respectively.

When the driver treads on the brake pedal 212, the electronic control apparatus opens the solenoid on-off valve 226, and closes the solenoid on-off valves 224L and 224R. In this state, the electronic control apparatus calculates a target deceleration Gt of the vehicle on the basis of the master cylinder pressures Pm1 and Pm2 detected by the pressure sensors 266 and 268 and the treading stroke St detected by the stroke sensor 270. The electronic control apparatus then calculates target wheel cylinder pressures Pti (i=fl, fr, rl, rr) of the wheels on the basis of the target deceleration Gt of the vehicle such that the target wheel cylinder pressures Pti become higher than the master cylinder pressures Pm1 and Pm2. Subsequently, the electronic control apparatus controls the linear valves 250FL to 250RR and the linear valves 260FL to 260RR such that the braking pressures Pi of the wheels coincide with the target wheel cylinder pressures Pti.

As can be understood from the above description, the electronic control apparatus sets the target wheel cylinder pressures Pti of the wheels to values higher than the master cylinder pressures Pm1 and Pm2 on the basis of the magnitude of the driver's braking operation; and in cooperation with the solenoid on-off valves 224L and 224R, the solenoid on-off valve 226, the motor 234, the linear valves 250FL to 250RR, the linear valves 260FL to 260RR, and various sensors, such as the pressure sensor 266 and through use of the pressure of the high-pressure pressure source, the electronic control apparatus controls the linear valves 250FL to 250RR and the linear valves 260FL to 260RR, in a state in which the solenoid on-off valves 224L and 224R are closed, such that the wheel cylinder pressures of the wheels coincide with the corresponding target wheel cylinder pressures.

In this case, in a situation where the communication between the master cylinder 214 and the wheel cylinders 222FL and 222FR is cut off as a result of the solenoid on-off valves 224L and 224R being closed, the brake stoke simulator 10 allows the driver to tread on the brake pedal 212 over a certain stroke, and imparts a reaction force to the driver via the brake pedal 212 in accordance with a desired continuous nonlinear characteristic.

First Embodiment

Figure 1:
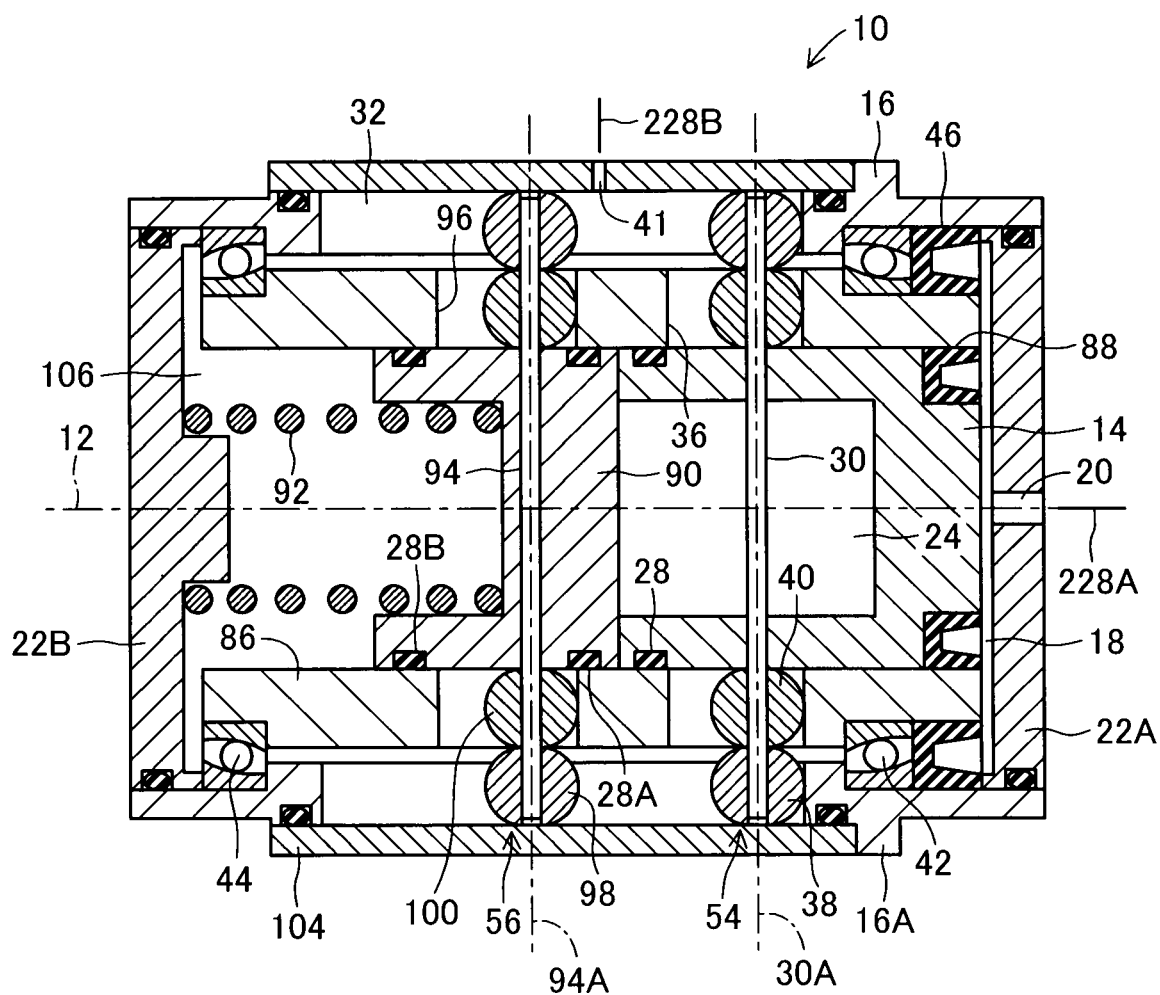
FIG. 1 is an axially-taken sectional view showing a first embodiment of a motion conversion transmission apparatus according to the present invention and configured as a brake stroke simulator.
Figure 2:
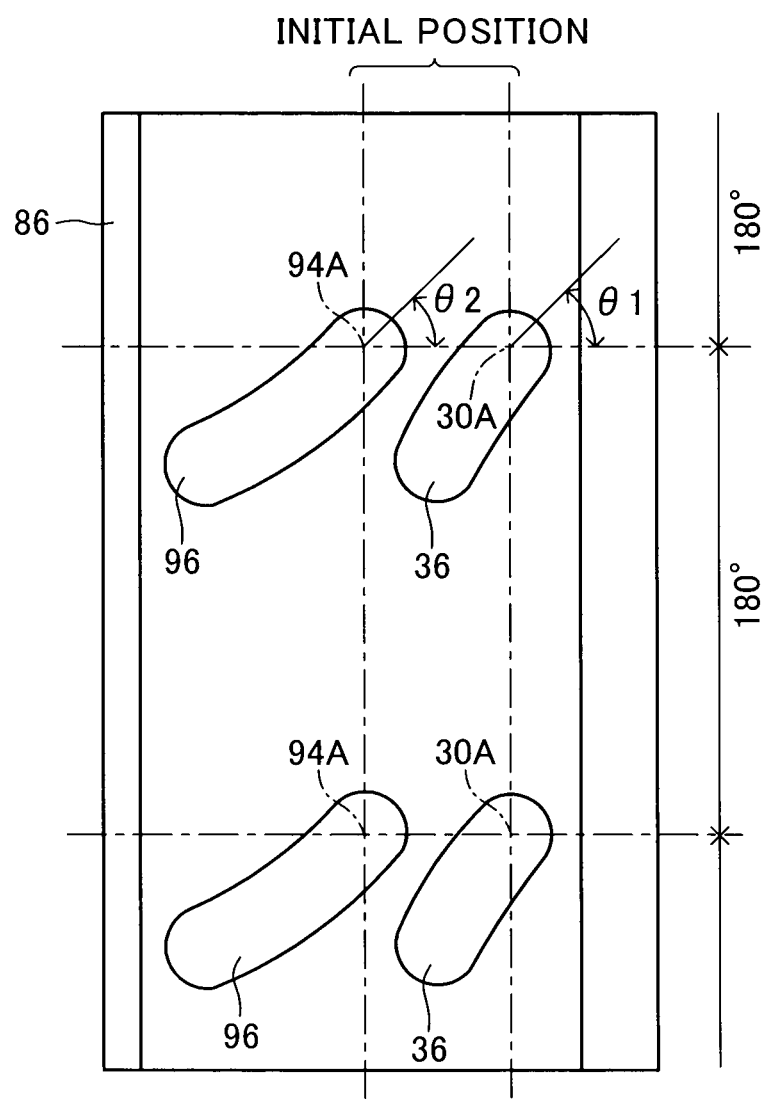
FIG. 2 is a development view in which an intermediate rotor of the first embodiment is developed on a plane.

FIG. 1 is an axially-taken sectional view showing a first embodiment of a motion conversion transmission apparatus according to the present invention and configured as a brake stroke simulator. FIG. 2 is a development view in which an intermediate rotor of the first embodiment is developed on a plane.

In these drawings, reference numeral 10 denotes the overall brake stroke simulator. The stroke simulator 10 has an input piston (input member) 14, which extends along an axis 12 and can move rectilinearly along the axis 12; an intermediate rotor (intermediate member) 86, which extends along the axis 12 and can rotate about the axis 12; and an output piston (output member) 90, which extends along the axis 12 and can move rectilinearly along the axis 12. The input piston 14, the intermediate rotor 86, and the output piston 90 are disposed within a housing 16. The housing 16 is formed by a cylindrical tubular body 16A and end caps 22A and 22B fixed to opposite ends of the body 16A by means of press fit or the like.

The intermediate rotor 86 is fitted into the housing 16. The intermediate rotor 86 is supported at its axially opposite end portions by angular bearings 42 and 44 provided between the same and the housing 16, in such a manner as to be rotatable about the axis 12 in relation to the housing 16. The angular bearings 42 and 44 allow the intermediate rotor 86 to rotate about the axis 12 in relation to the housing 16, but prevent the intermediate rotor 86 from moving along the axis 12 in relation to the housing 16. Cup seals 46 and 48, which extend annularly about the axis 12, are attached to the angular bearings 42 and 44, respectively, from axially outside. The cup seals 46 and 48 are formed of an elastic material such as rubber. While allowing the intermediate rotor 86 to rotate about the axis 12 in relation to the housing 16, the cup seals 46 and 48 prevent entry of foreign matter, such as dust and muddy water, into the angular bearings 42 and 44.

The input piston 14 and the output piston 90 are fitted into the intermediate rotor 86, and are supported by the intermediate rotor 86 such that the input piston 14 and the output piston 90 can reciprocate along the axis 12 in relation to the intermediate rotor 86. In cooperation with the output piston 90 and the end cap 22A of the housing 16, the input piston 14 defines a first cylinder chamber 18 whose volume is variable. The end cap 22A has a communication hole 20 formed therein, and the first cylinder chamber 18 is connected to and communicates with the first master cylinder chamber 214A via the communication hole 20 and the pipe 228A, whereby the first cylinder chamber 18 is filled with oil. As a liquid pressure in the first cylinder chamber 18 rises, the input piston 14 moves along the axis 12 leftward, as viewed in FIG. 1, according to the liquid pressure.

Further, in cooperation with the intermediate rotor 86 and the output piston 90, the input piston 14 defines a second cylinder chamber 24 whose volume is variable. A cup seal 88 is fitted onto the outer circumference of one end of the input piston 14. The cup seal 88 provides a seal between the input piston 14 and the inner wall surface of the intermediate rotor 86, whereby communication between the first cylinder chamber 18 and the second cylinder chamber 24 is cut off. An antifriction ring 28, such as a TEFLON (registered trademark) ring, is attached to the outer circumference of the other end portion of the input piston 14. The antifriction ring 28 reduces frictional resistance when the input piston 14 moves rectilinearly in relation to the intermediate rotor 86. Notably, although not shown in FIGS. 1 and 2, the housing 16 or the end cap 22A or 22B is mounted to the vehicle body, whereby the stroke simulator 10 is fixed to the vehicle body.

In cooperation with the intermediate rotor 86 and the end cap 22B of the housing 16, the output piston 90 defines a third cylinder chamber 106 whose volume is variable. Antifriction rings 28A and 28B, similar to the antifriction ring 28, are attached to the outer circumferences of opposite end portions of the output piston 90. In the illustrated embodiment, each of the input piston 14 and the output piston 90 has a cup-shaped cross section which opens toward the end cap 22B. A compression coil spring (reaction force generation means) 92 is disposed in the third cylinder chamber 106 between the output piston 90 and the end cap 22B.

A load transmission rod 30 extends through the input piston 14 perpendicularly to the axis 12 and is fixed to the input piston 14 by means of press fit or the like. Opposite end portions of the load transmission rod 30 extend through respective cam groove 36 provided in the intermediate rotor 86 and respective guide groove 32 provided in the body 16A of the housing 16. The opposite end portions of the load transmission rod 30 support respective substantially spherical guide rollers 38 and cam rollers 40 in such a manner that the guide rollers 38 and the cam rollers 40 are rotatable about an axis 30A of the load transmission rod 30. The guide rollers 38 are rollably engaged with wall surfaces of the corresponding guide grooves 32. The cam rollers 40 are rollably engaged with wall surfaces of the corresponding cam grooves 36. The width of the guide grooves 32 and the width of the cam grooves 36 are set slightly greater than the maximum diameter of the guide rollers 38 and the maximum diameter of the cam rollers 40, respectively.

Similarly, a load transmission rod 94 extends through the output piston 90 perpendicularly to the axis 12 and is fixed to the output piston 90 by means of press fit or the like. An axis 94A of the load transmission rod 94 extends in parallel with the axis 30A of the load transmission rod 30. However, the axis 94A may be inclined with respect to the axis 30A as viewed from the direction of the axis 12, so long as the axis 94A is perpendicular to the axis 12. Opposite end portions of the load transmission rod 94 extend through respective cam grooves 96 provided in the intermediate rotor 86 and into the respective guide grooves 32 provided in the body 16A of the housing 16. The opposite end portions of the load transmission rod 94 support respective guide rollers 98 and respective cam rollers 100 such that the guide rollers 98 and the cam rollers 100 are rotatable about an axis 94A of the load transmission rod 94. The guide rollers 98 are rollably engaged with wall surfaces of the corresponding guide grooves 32. The cam rollers 100 are rollably engaged with wall surfaces of the corresponding cam grooves 96 provided in the intermediate roller 86. The width of the guide grooves 32 and the width of the cam grooves 96 are set slightly greater than the maximum diameter of the guide rollers 98 and the maximum diameter of the cam rollers 100, respectively.

The width of the guide grooves 32 is set to a value slightly greater than the maximum diameter of the guide rollers 38 and 98, and the width of the cam grooves 36 and 96 is set to a value slightly greater than the maximum diameter of the cam rollers 38 and 100. The cam grooves 36 and 96 communicate all times with the second cylinder chamber 24 and the third cylinder chamber 106, respectively, and communicate all times with the guide groves 32 via a clearance between the intermediate rotor 86 and the body 16A of the housing 16. The guide grooves 32 extend along the axis 12 so as to function as common guide grooves for the guide rollers 38 and 98. A cylindrical cover 104 is fixed to the outer circumference of the body 16A of the housing 16 by means of press fit or the like. The cover 104 is tightly fitted to the body 16A, thereby shutting off the guide grooves 32 from the outside. The guide grooves 32 communicate at all times with the reservoir 230 via a communication hole 41 provided in the cover 104, and the pipe 228B.

The two guide grooves 32 are spaced 180° apart from each other about the axis 12 and extend rectilinearly in parallel with the axis 12. Accordingly, the guide rollers 38 can only move in the respective guide grooves 32 rectilinearly along the axis 12, except for rotary motion about the load transmission rod 30. The two cam grooves 36 are also spaced 180° apart from each other about the axis 12. However, as shown in FIG. 2, the cam grooves 36 are curved and extend while being inclined with respect to the axis 12 and the circumferential direction. Accordingly, each of the cam rollers 40 can only move in the cam groove 36 along a trajectory of motion which is curved and inclined with respect to the axis 12 and the circumferential direction, except for rotary motion about the load transmission rod 30.

Although the cam grooves 96 extend while being inclined with respect to the axis 12 and the circumferential direction, each of the cam grooves 96 is curved in the reverse direction of the cam groove 36 and extends such that the angle of inclination with respect to the circumferential direction increases gradually in the course from its right end toward its left end as viewed in FIG. 2. A right end portion as viewed in FIG. 2 of each of the cam grooves 96 and a left end portion as viewed in FIG. 2 of each of the cam grooves 36 overlap with each other with respect to axial position. Also, the extending length of the cam grooves 96 along the axis 12 is set longer than that of the cam grooves 36. Furthermore, inclination angles θ1 and θ2 with respect to the axis 12 of right end portions as viewed in FIG. 2 of the cam grooves 36 and 96, respectively, assume the same angle.

As shown in FIG. 1, at the time of nonbraking, the cam rollers 40 and 100 are positioned at their initial positions, where the cam rollers 40 and 100 are in contact with the right ends as viewed in FIG. 2 of the cam grooves 36 and 96, respectively. When the cam rollers 40 and 100 are positioned at their initial positions, the input piston 14 is positioned at its initial position, where the volume of the first cylinder chamber 18 becomes minimum, and the output piston 90 is positioned at its initial position, where the output piston 90 is in contact with the input piston 14. Thus, the amount of compressive deformation of the compression coil spring 92 becomes minimum. Also, at the time of nonbraking, a spring force of the compression coil spring 92 urges the load transmission rods 30 and 94 rightward as viewed in FIG. 1, whereby the input piston 14 and the output piston 90 are positioned at their initial positions. When the input piston 14 and the output piston 90 are positioned at their initial positions, the input piston 14 and the output piston 90 are in contact with each other.

When the input piston 14 is positioned at its initial position, the left end as viewed in FIG. 1 of the input piston 14 is positioned on a side toward the first cylinder chamber 18 with respect to the left ends as viewed in FIG. 1 of the cam grooves 36. Also, as mentioned above, a right end portion as viewed in FIG. 2 of each of the cam grooves 96 and a left end portion as viewed in FIG. 2 of each of the cam grooves 36 overlap with each other with respect to axial position. Accordingly, the second cylinder chamber 24 between the input piston 14 and the output piston 90 communicates with the cam grooves 36 and 96 via a gap between the input piston 14 and the output piston 90 and is thus filled with oil. Also, when the output piston 90 is positioned at its initial position, the left end as viewed in FIG. 1 of the output piston 90 is positioned on a side toward the first cylinder chamber 18 with respect to the left ends as viewed in FIG. 1 of the cam grooves 96. Accordingly, the third cylinder chamber 106 between the output piston 90 and the end cap 22B communicates with the cam grooves 96 and is thus filled with oil.

Thus, in the illustrated first embodiment, the load transmission rod 30, the guide grooves 32, the cam grooves 36, the guide rollers 38, the cam rollers 40, etc. cooperatively function as first transmission means 54 for converting a rectilinear motion along the axis 12 of the input piston 14 to a rotary motion about the axis 12 and transmitting the rotary motion to the intermediate rotor 86, and, as will be described later, transmitting a reaction torque transmitted to the intermediate rotor 86 to the input piston 14 as a reaction force along the axis 12. Also, the first transmission means 54 gradually increases the ratio of the amount of rotary motion of the intermediate rotor 86 to the amount of rectilinear motion along the axis 12 of the input piston 14 with the amount of rectilinear motion of the input piston 14.

Also, the load transmission rod 94, the guide grooves 32, the cam grooves 96, the guide rollers 98, the cam rollers 100, etc. cooperatively function as second transmission means 56 for converting a rotary motion of the intermediate rotor 86 to a rectilinear motion along the axis 12 and transmitting the rectilinear motion to the output piston 90; compressively deforming the compression coil spring 92 via the output piston 90; and transmitting a reaction force of the compression coil spring 92 to the intermediate rotor 86 as a reaction torque about the axis 12. Also, the second transmission means 56 gradually increases the ratio of the amount of rectilinear motion along the axis 12 of the output piston 90 to the amount of rotary motion of the intermediate rotor 86 with the amount of rotary motion of the intermediate rotor 86, thereby gradually increasing the ratio of the amount of rectilinear motion along the axis 12 of the output piston 90 to the amount of rectilinear motion along the axis 12 of the input piston 14 with the amount of rectilinear motion of the input piston 14.

In the first embodiment configured as described above, when the input piston 14 moves rectilinearly along the axis 12 toward the left side as viewed in FIG. 1 as a result of rising of the hydraulic pressure within the master cylinder 214, the first transmission means 54 converts the rectilinear motion of the input piston 14 to a rotary motion about the axis 12, and transmits the rotary motion to the intermediate rotor 86; and the second transmission means 56 converts the rotary motion of the intermediate rotor 86 to a rectilinear motion along the axis 12, and transmits the rectilinear motion to the output piston 90. Since the ratio of the amount of rectilinear motion of the output piston 90 to the amount of rectilinear motion of the input piston 14 is determined by the actions of both the first transmission means 54 and the second transmission means 56, the ratio of the amount of compressive deformation of the compression coil spring 92 to the amount of rectilinear motion of the input piston 14 is also determined by actions of both the first transmission means 54 and the second transmission means 56.

Figure 13:
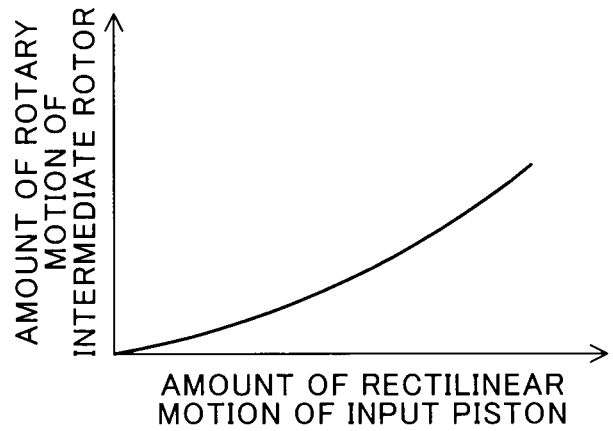
FIG. 13 is a graph showing the relation between the amount of rectilinear motion of the input piston and the amount of rotary motion of the intermediate rotor.
Figure 14:
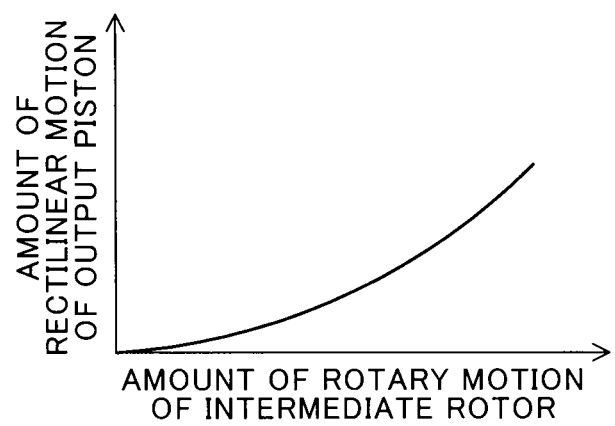
FIG. 14 is a graph showing the relation between the amount of rotary motion of the intermediate rotor and the amount of rectilinear motion of the output piston.
Figure 15:
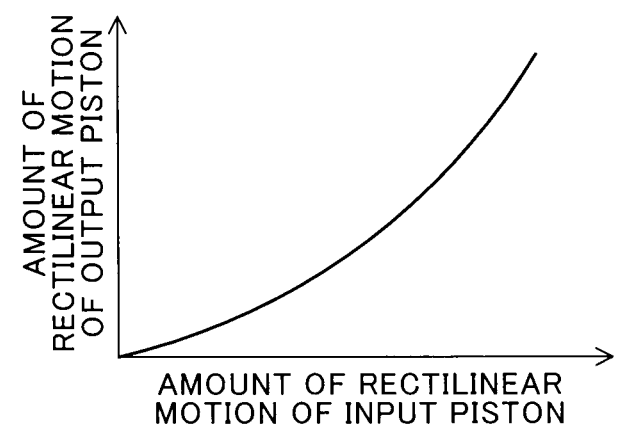
FIG. 15 is a graph showing the relation between the amount of rectilinear motion of the input piston and the amount of rectilinear motion of the output piston.
Figure 16:
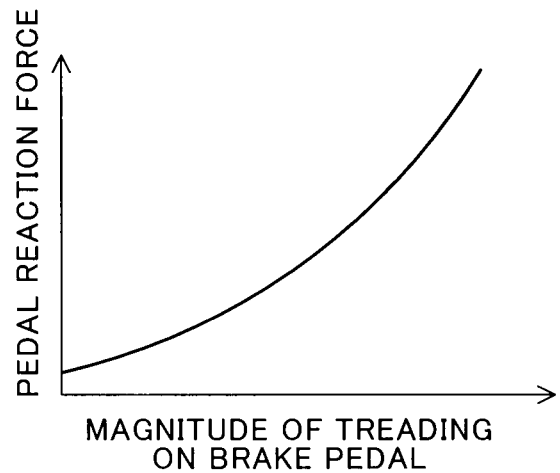
FIG. 16 is a graph showing the relation between the magnitude of treading on a brake pedal and pedal reaction force.
Figure 17:
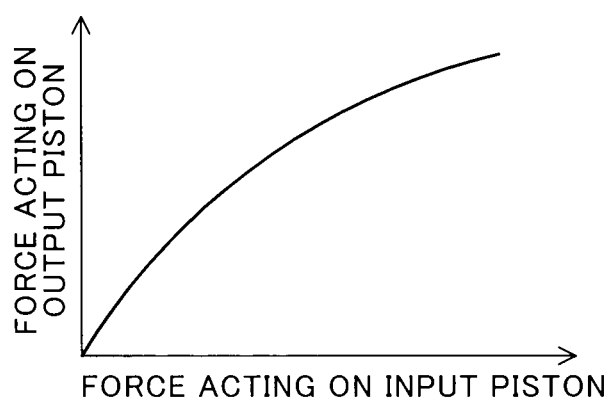
FIG. 17 is a graph showing the relation between force acting on the input piston and force acting on the output piston.

Here, the amount of rectilinear motion of the input piston 14 and the amount of rotary motion of the intermediate rotor 86 are assumed to have a relation as shown in FIG. 13, and the amount of rotary motion of the intermediate rotor 86 and the amount of rectilinear motion of the output piston 90 are assumed to have a relation as shown in FIG. 14. In such a case, the amount of rectilinear motion of the input piston 14 and the amount of rectilinear motion of the output piston 90 have a relation as shown in FIG. 15. Thus, the pedal reaction force changes with the amount of treading on the brake pedal 212 as shown in FIG. 16. Notably, since the transmission ratio of force is the reciprocal of the transmission ratio of motion (displacement), a relation as shown in FIG. 17 is present between the force acting on the input piston 14 along the axis 12 and the force acting on the output piston 90 along the axis 12.

In the illustrated first embodiment, through proper setting of the shapes of the cam grooves 36 and 96 in accordance with a desired transmission characteristic, rectilinear motion and force can be transmitted from the input piston 14 to the output piston 90 in accordance with a desired continuous nonlinear transmission characteristic over the entire range. Also, although the compression coil spring 92, which is deformed by the output piston 90, has a linear spring characteristic, a desired continuous nonlinear transmission characteristic can be imparted to the change in the pedal reaction force with the amount of treading on the brake pedal 212.

In the illustrated first embodiment, when the input piston 14 moves rectilinearly leftward as viewed in FIG. 1 along the axis 12, as mentioned above, the output piston 90 also moves rectilinearly leftward as viewed in FIG. 1 along the axis 12. However, the amount of rectilinear motion of the output piston 90 is greater than that of the input piston 14. Accordingly, the volume of the second cylinder chamber 24 increases, whereas the volume of the third cylinder chamber 106 decreases. By contrast, when the input piston 14 moves rectilinearly rightward as viewed in FIG. 1 along the axis 12, the volume of the second cylinder chamber 24 decreases, whereas the volume of the third cylinder chamber 106 increases.

Since the second cylinder chamber 24 communicates with the cam grooves 36 as mention above, when the volume of the second cylinder chamber 24 increases or decreases, oil flows between the second cylinder chamber 24 and the cam grooves 36. Also, since the third cylinder chamber 106 communicates with the cam grooves 96 as mentioned above, when the volume of the third cylinder chamber 106 increases or decreases, oil flows between the third cylinder chamber 106 and the cam grooves 96.

Also, second to fifth embodiments to be described later are similar to the present embodiment in the following actions of the first transmission means 54 and the second transmission means 56: conversion of a rectilinear motion of the input piston 14 to a rotary motion of the intermediate rotor 86 and conversion of the rotary motion of the intermediate rotor 86 to a rectilinear motion of the output piston 90; determination of the ratio of the amount of rectilinear motion of the output piston 90 to the amount of rectilinear motion of the input piston 14; and transmission of reaction force of the compression coil spring 92 to the input piston 14 via the output piston 90 and the intermediate rotor 86.

Particularly, according to the illustrated first embodiment, even in a situation in which communication is shut off between the master cylinder and the wheel cylinders, the stroke simulator 10 allows the driver to tread on the brake pedal 212 over a certain stroke and increases continuously and nonlinearly a brake reaction force which the driver feels from the brake pedal 212, with the magnitude of treading on the brake pedal 212. Thus, the stroke simulator 10 can provide an optimum brake operation feeling.

Also, according to the illustrated first embodiment, the first transmission means 54 converts a rectilinear motion along the axis 12 of the input piston 14 to a rotary motion about the axis 12 of the intermediate rotor 86, and the second transmission means 56 converts the rotary motion of the intermediate rotor 86 to a rectilinear motion along the axis 12 of the output piston 90, thereby compressively deforming the compression coil spring 92 along the axis 12. Thus, all of component members can be disposed with the axis 12 used as a reference. This configurational feature also applies to other embodiments to be described later.

Also, according to the illustrated first embodiment, when the input piston 14 is positioned at its initial position, since the compression coil spring 92 urges the output piston 90 rightward as viewed in FIG. 1, the load transmission rods 30 and 94, etc. are positioned at their rightmost initial positions, and the output piston 90 is in contact with the input piston 14. Thus, at the time of nonbraking, the occurrence of shaky movement of the input piston 14 and the output piston 90 can be effectively prevented.

Second Embodiment

Figure 3:
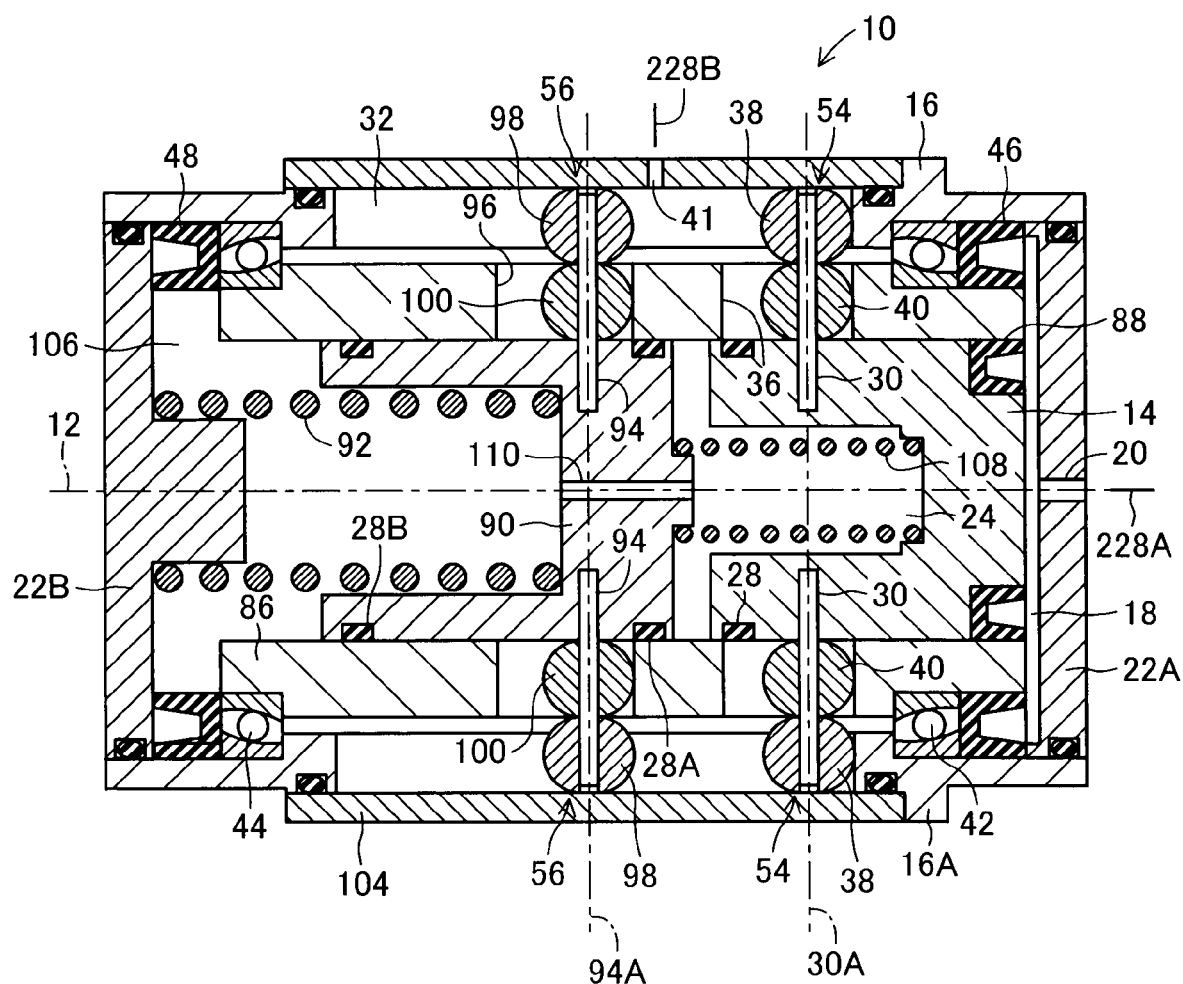
FIG. 3 is an axially-taken sectional view showing a second embodiment of the motion conversion transmission apparatus according to the present invention and configured as a brake stroke simulator.
Figure 4:
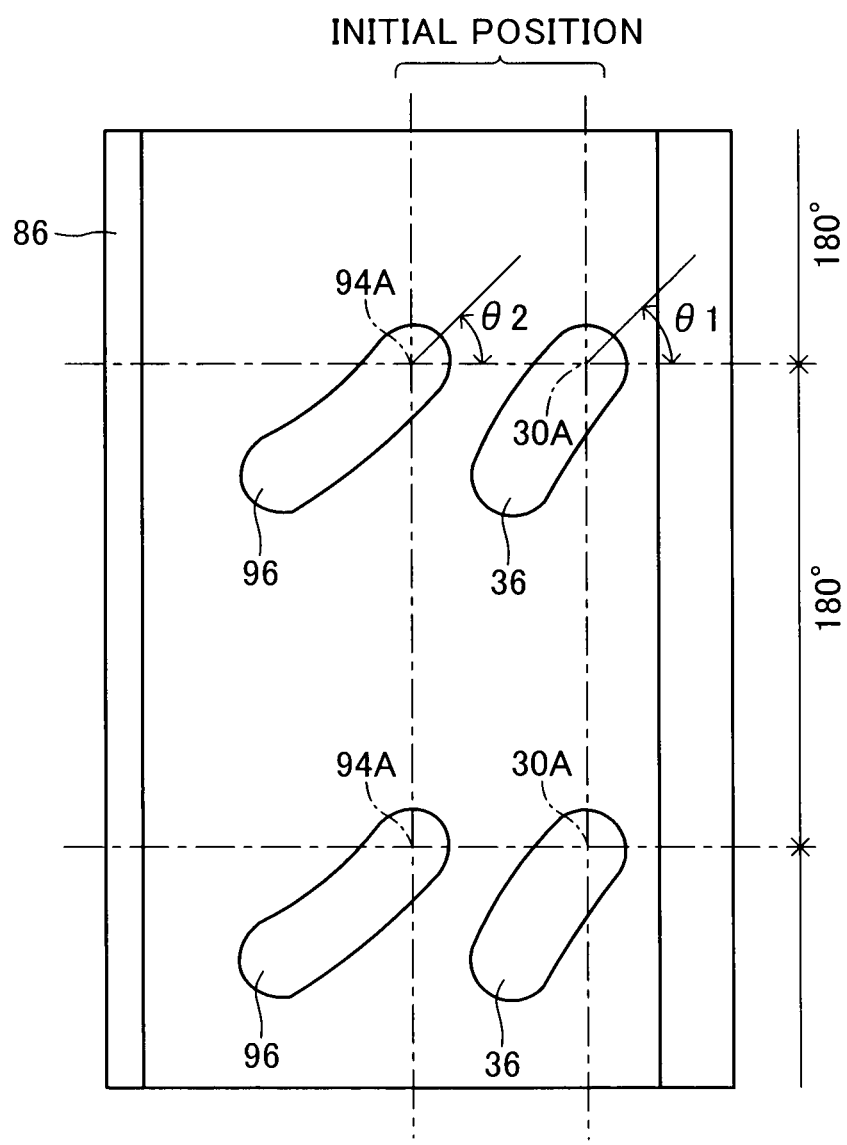
FIG. 4 is a development view in which an intermediate rotor of the second embodiment is developed on a plane.

FIG. 3 is an axially-taken sectional view showing a second embodiment of the motion conversion transmission apparatus according to the present invention and configured as a brake stroke simulator. FIG. 4 is a development view in which an intermediate rotor of the second embodiment is developed on a plane. In FIGS. 3 and 4, members similar to those shown in FIGS. 1 and 2 are denoted by the same reference numerals appearing in FIGS. 1 and 2. This convention also applies to other embodiments to be described later.

In the second embodiment, each of the load transmission rods 30 and 94 is divided into two radially extending pieces. The individual load transmission rods 30 and the individual load transmission rods 94 are supported at their radially inner end portions by the input piston 14 and the output piston 90, respectively, in a cantilever fashion. A tension coil spring 108 extending along the axis 12 is disposed in the second cylinder chamber 24. The tension coil spring 108 is fixed at one end to the input piston 14 and is fixed at the other end to the output piston 90. Thus, the tension coil spring 108 applies such a tensile load to the input piston 14 and the output piston 90 as to draw the input piston 14 and the output piston 90 toward each other.

The axial length of the input piston 14 is set shorter than that in the above-described first embodiment. Thus, even when the input piston 14 and the output piston 90 are positioned at respective initial positions, the left end as viewed in FIG. 3 of the input piston 14 is spaced apart from the output piston 90. By contrast, the axial length of the output piston 90 is set longer than that in the above-described first embodiment. Thus, even when the output piston 90 is positioned at its initial position, the antifriction ring 28B shuts off the third cylinder chamber 106 from the cam grooves 96.

The output piston 90 has an orifice 110 which extends in alignment with the axis 12. Thus, the third cylinder chamber 106 communicates at all times with the cam grooves 36 via the orifice 110 and the second cylinder chamber 24. The cup seal 48 is disposed between the end cap 22B and the angular bearing 44, thereby preventing flow of oil between the third cylinder chamber 106 and the cam grooves 36 via the angular bearing 44. The cam grooves 36 and the cam grooves 96 are spaced apart from each other along the axis 12 by a distance longer than that in the above-described first embodiment. Thus, a right end portion as viewed in FIG. 4 each of the cam grooves 96 and a left end portion as viewed in FIG. 4 of each of the cam grooves 36 do not overlap with each other with respect to axial position. However, the cam grooves 36 and the cam grooves 96 may overlap with each other as in the case of the above-described first embodiment. Other configurational features of the second embodiment are similar to those of the above-described first embodiment.

In the second embodiment, the first transmission means 54 and the second transmission means 56 function similar to the case of the above-described first embodiment. Thus, when the input piston 14 moves rectilinearly leftward as viewed in FIG. 3 along the axis 12, the output piston 90 also moves rectilinearly leftward as viewed in FIG. 3 along the axis 12. However, the amount of rectilinear motion of the output piston 90 is greater than that of the input piston 14. Accordingly, the distance between the input piston 14 and the output piston 90 gradually increases, whereas the distance between the output piston 90 and the end cap 22B gradually decreases.

Accordingly, when the input piston 14 moves rectilinearly leftward as viewed in FIG. 3 along the axis 12, the output piston 90, which serves as an output member, compressively deforms the compression coil spring 92 and tensilely deforms the tension coil spring 108. Thus, the output piston 90 is subjected to a reaction force associated with compressive deformation of the compression coil spring 92 and a reaction force associated with tensile deformation of the tension coil spring 108. These reaction forces increase nonlinearly such that, as the amount of leftward rectilinear motion as viewed in FIG. 3 of the input piston 14 increases, the rate of increase gradually increases.

By contrast, when the input piston 14 moves rectilinearly rightward as viewed in FIG. 3 along the axis 12, the distance between the input piston 14 and the output piston 90 decreases, whereas the distance between the output piston 90 and the end cap 22B increases. Accordingly, when the input piston 14 moves rectilinearly rightward as viewed in FIG. 3 along the axis 12, the output piston 90 reduces the amount of compressive deformation of the compression coil spring 92 and the amount of tensile deformation of the tension coil spring 108. A reaction force associated with compressive deformation of the compression coil spring 92 and the tensile deformation of the tension coil spring 108 which act on the output piston 90 decrease nonlinearly such that, as the amount of rightward rectilinear motion as viewed in FIG. 3 of the input piston 14 increases, the rate of decrease gradually decreases.

A spring force associated with tensile deformation of the tension coil spring 108 acts on the input piston 14 in such a manner as to reduce the reaction force against the force with witch the input piston 14 is moved rectilinearly; however, a spring force associated with tensile deformation of the tension coil spring 108 acts on the output piston 90 in such a manner as to increase the reaction force. Since these spring forces are of opposite directions and have the same magnitude, the spring force of the tension coil spring 108 does not cause increase and decrease of the reaction force.

Thus, according to the illustrated second embodiment, similar to the above-described first embodiment, rectilinear motion and force can be transmitted from the input piston 14 to the output piston 90 in accordance with a desired continuous nonlinear transmission characteristic over the entire range. Also, a desired continuous nonlinear transmission characteristic can be imparted to the change in the pedal reaction force with the amount of treading on the brake pedal 212.

Particularly, according to the illustrated second embodiment, the output piston 90 has the orifice 110 for establishing communication between the second cylinder chamber 24 and the third cylinder chamber 106. The higher the treading speed of the brake pedal 212, the higher the flow resistance associated with passage of oil through the orifice 110. Since the flow resistance has the effect of increasing a reaction force, the higher the treading speed of the brake pedal 212 and the higher the speed of the rectilinear motion of the input piston 14, the greater an operational reaction force.

Also, according to the illustrated second embodiment, the tension coil spring 108 is elastically attached between the input piston 14 and the output piston 90, so that shaky movements of the input piston 14, the output piston 90, etc. can be effectively restrained. Since the input piston 14 and the output piston 90 are spaced apart from each other even at their initial positions, in the course of return of the input piston 14 and the output piston 90 to their initial positions, their mutual strike can be reliably prevented.

Third Embodiment

Figure 5:
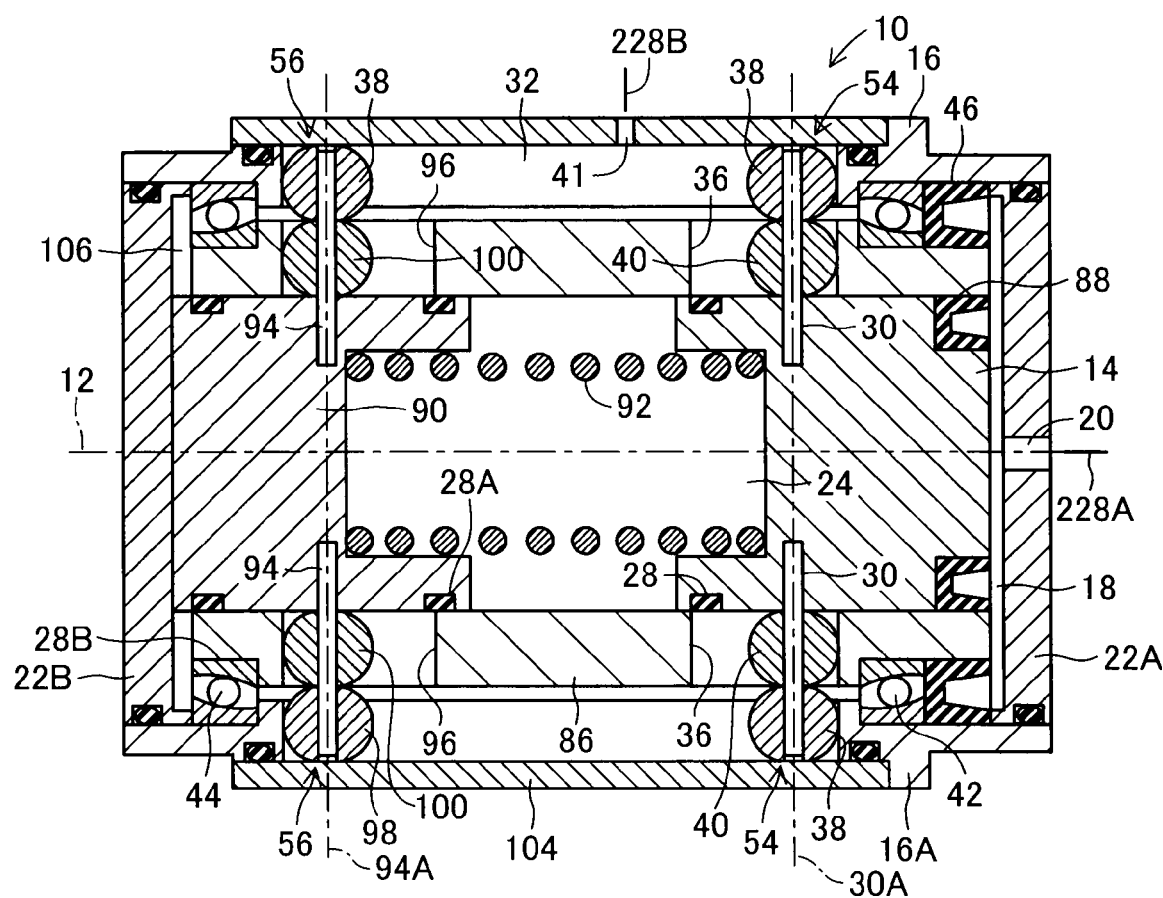
FIG. 5 is an axially-taken sectional view showing a third embodiment of the motion conversion transmission apparatus according to the present invention and configured as a brake stroke simulator.
Figure 6:
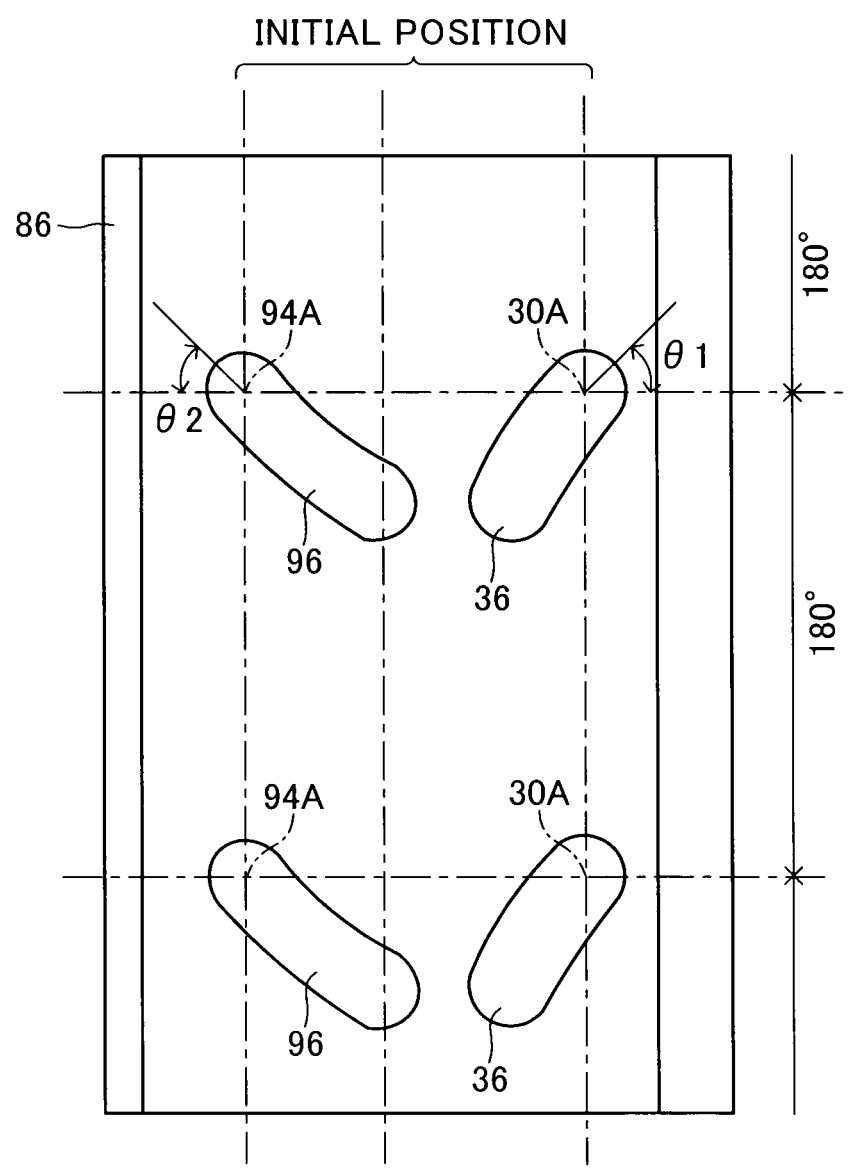
FIG. 6 is a development view in which an intermediate rotor of the third embodiment is developed on a plane.

FIG. 5 is an axially-taken sectional view showing a third embodiment of the motion conversion transmission apparatus according to the present invention and configured as a brake stroke simulator. FIG. 6 is a development view in which an intermediate rotor (intermediate member) of the third embodiment is developed on a plane.

In the third embodiment, similar to the above-described second embodiment, each of the load transmission rods 30 and 94 is divided into two radially extending pieces. The individual load transmission rods 30 and the individual load transmission rods 94 are supported at their radially inner end portions by the input piston 14 and the output piston 90, respectively, in a cantilever fashion. The input piston 14 has a cup-like sectional shape which opens toward the end cap 22B, whereas the output piston 90 has a cup-like sectional shape which opens toward the input piston 14. The compression coil spring 92, which serves as reaction force generation means, is disposed in the second cylinder chamber 24 and is elastically attached between the input piston 14 and the output piston 90.

Notably, the load transmission rods 30 and 94 may each assume the form of a single rod which diametrally extends through each of the input piston 14 and the output piston 90.

As shown in FIG. 6, the cam grooves 96 are provided in the intermediate rotor 86 in such a manner as to be inclined, with respect to the axis 12 and the circumferential direction, in a direction opposite the direction of the cam grooves 96 in the above-described first and second embodiments. Accordingly, at the time of nonbraking, the guide rollers 38 and the cam rollers 40, which partially constitute the first transmission means 54, are positioned at their initial positions where the guide rollers 38 and the cam rollers 40 are in contact with right ends as viewed in FIG. 5 of the guide grooves 32 and the cam grooves 36, respectively, whereas the guide rollers 98 and the cam rollers 100, which partially constitute the second transmission means 56, are positioned at their initial positions where the guide rollers 98 and the cam rollers 100 are in contact with left ends as viewed in FIG. 5 of the guide grooves 32 and the cam grooves 96, respectively. When the guide rollers 38 and the cam rollers 40 are positioned at their initial positions, the input piston 14 is positioned closest to the end cap 22A. When the guide roller 98 and the cam rollers 100 are positioned at their initial positions, the output piston 90 is in contact with the end cap 22B. Thus, the volumes of the first cylinder chamber 18 and the third cylinder chamber 106 become minimum, and the volume of the second cylinder chamber 24 becomes maximum.

Other configurational features of the third embodiment are similar to those of the above-described first embodiment. Accordingly, the first transmission means 54 functions similar to that of the first embodiment. The second transmission means 56 functions similar to that of the first embodiment except that the relation between the direction of rotary motion of the intermediate rotor 86 and the direction of rectilinear motion of the output piston 90 is in reverse.

Thus, when the input piston 14 moves rectilinearly leftward as viewed in FIG. 5 along the axis 12, the output piston 90 moves rectilinearly rightward as viewed in FIG. 5 along the axis 12, whereby the input piston 14 and the output piston 90 compressively deform the compression coil spring 92 in cooperation with each other. In this case, the rate of decrease of distance between the input piston 14 and the output piston 90 increases with the amount of leftward rectilinear motion as viewed in FIG. 5 of the input piston 14. Accordingly, a reaction force of the compression coil spring 92 imposed on the input piston 14 nonlinearly increases such that the rate of increase gradually increases with the amount of leftward rectilinear motion as viewed in FIG. 5 of the input piston 14.

By contrast, when the input piston 14 rectilinearly moves rightward as viewed in FIG. 5 along the axis 12, the distance between the input piston 14 and the output piston 90 increases, and the amount of compressive deformation of the compression coil spring 92 decreases. Thus, a reaction force of the compression coil spring 92 imposed on the input piston 14 decreases nonlinearly such that, as the amount of rightward rectilinear motion as viewed in FIG. 5 of the input piston 14 increases, the rate of decrease gradually decreases.

Thus, according to the illustrated third embodiment, similar to the above-described first and second embodiments, rectilinear motion and force can be transmitted from the input piston 14 to the output piston 90 in accordance with a desired continuous nonlinear transmission characteristic over the entire range. Also, a desired continuous nonlinear transmission characteristic can be imparted to the change in the pedal reaction force with the amount of treading on the brake pedal 212.

Particularly, according to the illustrated third embodiment, a reaction force associated with compressive deformation of the compression coil spring 92 is not only transmitted to the input piston 14 via the intermediate rotor 86, etc., but also directly imposed on the input piston 14. Thus, as compared with the first and second embodiments described above and fourth and fifth embodiments to be described later, a load imposed on the load transmission rods 30 and 94, etc. is lowered, whereby the durability of the brake stroke simulator 10 can be improved.

Fourth Embodiment

Figure 7:
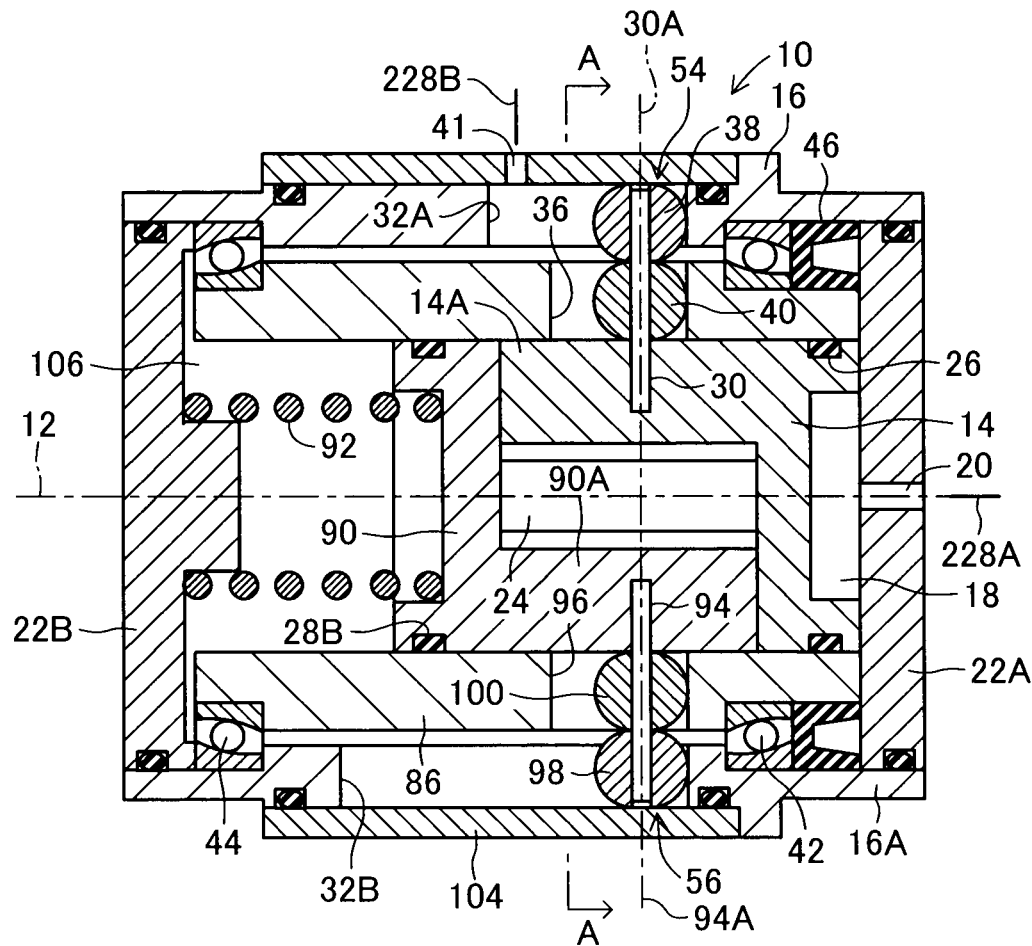
FIG. 7 is a sectional view cut along two cutting planes which cross at right angles on the axis, showing a fourth embodiment of the motion conversion transmission apparatus according to the present invention and configured as a brake stroke simulator.
Figure 8:
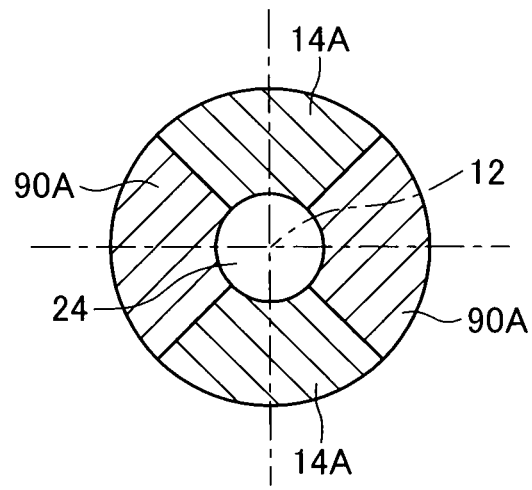
FIG. 8 is a cross-sectional view of an input piston and an output piston taken along line A-A of FIG. 7.
Figure 9:
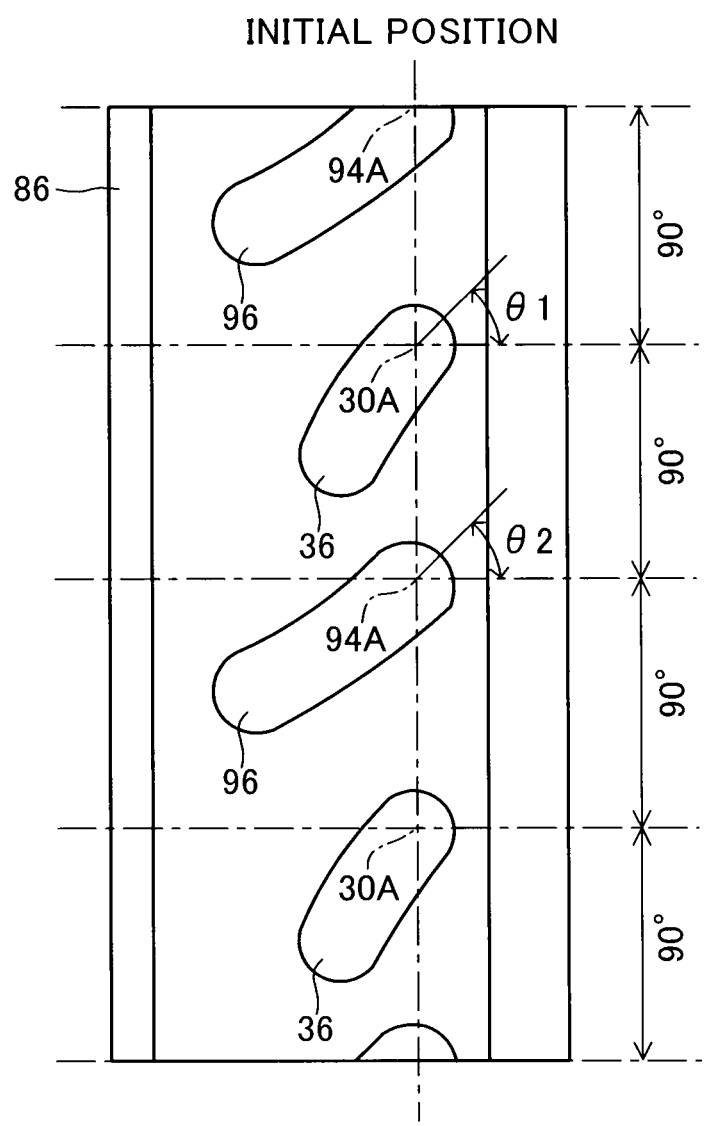
FIG. 9 is a development view in which an intermediate rotor of the fourth embodiment is developed on a plane.

FIG. 7 is a sectional view cut along two cutting planes which cross at right angles on the axis, showing a fourth embodiment of the motion conversion transmission apparatus according to the present invention and configured as a brake stroke simulator. FIG. 8 is a cross-sectional view of an input piston and an output piston taken along line A-A of FIG. 7. FIG. 9 is a development view in which an intermediate rotor of the fourth embodiment is developed on a plane.

In the fourth embodiment, the input piston 14 has a substantially columnar body portion fitted into the intermediate rotor 86, and a pair of arm portions 14A projecting from the body portion toward the output piston 90 along the axis 12. The paired arm portions 14A are spaced apart from each other in such a manner as to be located on diametrally opposite sides of the axis 12. Similarly, the output piston 90 has a substantially columnar body portion fitted into the intermediate rotor 86, and a pair of arm portions 90A projecting from the body portion toward the input piston 14 along the axis 12. The paired arm portions 90A are spaced apart from each other in such a manner as to be located on diametrally opposite sides of the axis 12. The section of each of the arm portions 14A and 90A taken perpendicularly to the axis 12 has a fanwise shape which has an outer arc line and an inner arc line and whose central angle is substantially 90°. Particularly, in the illustrated embodiment, the input piston 14 and the output piston 90 are the same members disposed in reverse.

Each of the arm portions 14A is positioned between the arm portions 90A with respect to the circumferential direction about the axis 12. Thus, the input piston 14 and the output piston 90 are engaged with each other in such a manner as to be rectilinearly movable along the axis 12 in relation to each other and to be nonrotatable about the axis 12 in relation to each other. Similar to the above-described first embodiment, the compression coil spring 92, which serves as reaction force generation means, is elastically attached between the output piston 90 and the end cap 22B. When the input piston 14 and the output piston 90 are positioned at their initial positions, ends of the arm portions 14A and ends of the arm portions 90A are in contact with the body portion of the output piston 90 and the body portion of the input piston 14, respectively, in a mutually pressing condition.

Similar to the above-described second and third embodiments, each of the load transmission rods 30 and 94 is divided into two radially extending pieces. The individual load transmission rods 30 and the individual load transmission rods 94 are supported at their radially inner end portions by the arm portions 14A of the input piston 14 and the arm portions 90A of the output piston 90, respectively, in a cantilever fashion. Particularly, in the illustrated embodiment, the load transmission rods 30 and 94 are positioned at the same axial position along the axis 12. Thus, these load transmission rods are alternately arranged in the circumferential direction about the axis 12 along a plane perpendicular to the axis 12 while being spaced 90° apart from one another. Notably, the load transmission rods 30 and the load transmission rods 94 may be located at mutually different axial positions.

As shown in FIG. 9, similar to the above-described first embodiment, the cam grooves 36 and 96 assume the same form as the cam grooves 36 and 96 in the above-described first and second embodiments; however, the cam grooves 36 and 96 are arranged alternately in the circumferential direction. Particularly, in the illustrated embodiment, right end portions of the cam grooves 36 and 96 are positioned at the same axial position, and the range in which the cam grooves 36 extend along the axis 12 overlaps the range in which the cam grooves 96 extend along the axis 12.

Also, the guide rollers 38 and 98 are engaged with the guide grooves 32A and 32B, respectively, provided in the body 16A of the housing 16. The guide grooves 32A and 32B extend rectilinearly along the axis 12 and are alternately arranged in the circumferential direction about the axis 12 while being spaced 90° apart from one another. As shown in FIG. 7, the guide grooves 32B are set longer than the guide grooves 32A. Other configurational features of the fourth embodiment are similar to those of the above-described first embodiment.

In the fourth embodiment, the first transmission means 54 and the second transmission means 56 function similar to those in the above-described first embodiment. Specifically, a rectilinear motion along the axis 12 of the input piston 14 is converted to a rotary motion about the axis 12; the rotary motion is transmitted to the intermediate rotor 86; the rotary motion of the intermediate rotor 86 is converted to a rectilinear motion along the axis 12; and the rectilinear motion is transmitted to the output piston 90. A reaction force which is generated along the axis 12 through compressive deformation of the compression coil spring 92 caused by the output piston 90 is converted to a reaction torque by the output piston 90; the reaction torque is transmitted to the intermediate rotor 86; the reaction torque of the intermediate rotor 86 is converted to a reaction force along the axis 12; and the reaction force is transmitted to the input piston 14. Similar to the above-described embodiments, the ratio of the amount of rectilinear motion of the output piston 90 to the amount of rectilinear motion of the input piston 14 exhibits a nonlinear characteristic.

Thus, according to the illustrated fourth embodiment, similar to the above-described first to third embodiments, rectilinear motion and force can be transmitted from the input piston 14 to the output piston 90 in accordance with a desired continuous nonlinear transmission characteristic over the entire range. Also, a desired continuous nonlinear transmission characteristic can be imparted to the change in the pedal reaction force with the amount of treading on the brake pedal 212.

Particularly, according to the illustrated fourth embodiment, the arm portions 14A of the input piston 14 and the arm portions 90A of the output piston 90 are engaged with each other in such a manner as to be rectilinearly movable along the axis 12 in relation to each other and to be nonrotatable about the axis 12 in relation to each other. Thus, the arm portions 14A and 90A also guide a relative motion along the axis 12 between the input piston 14 and the output piston 90 and prevent a relative rotation about the axis 12 between the input piston 14 and the output piston 90. Therefore, as compared with the above-described first and second embodiments, a relative rectilinear motion between the input piston 14 and the output piston 90 can be smoothly performed.

Also, according to the illustrated fourth embodiment, the input piston 14 and the output piston 90 are the same members disposed in an oppositely oriented relation. Thus, as compared with other embodiments in which the input piston 14 and the output piston 90 differ from each other, the number of types of components can be reduced, so that the cost of the stroke simulator 10 can be reduced.

Fifth Embodiment

Figure 10:
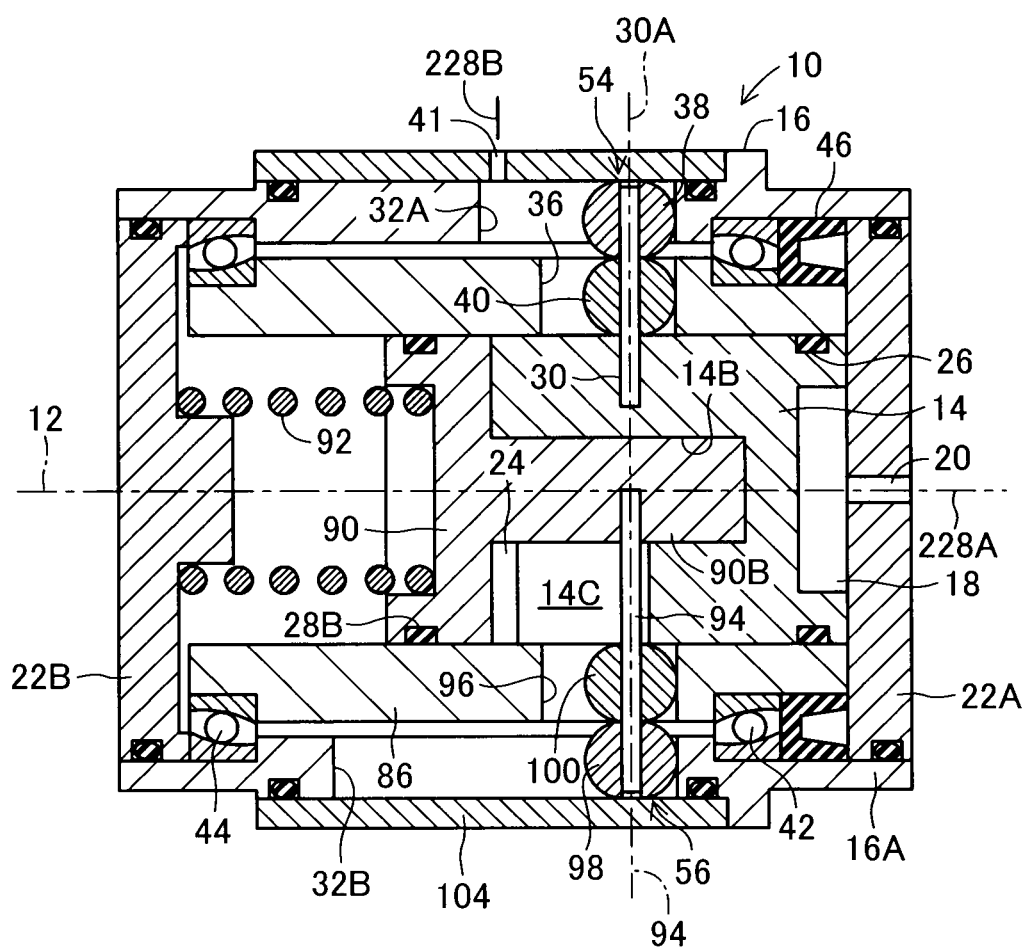
FIG. 10 is an axially-taken sectional view showing a fifth embodiment of the motion conversion transmission apparatus according to the present invention and configured as a brake stroke simulator.
Figure 11:
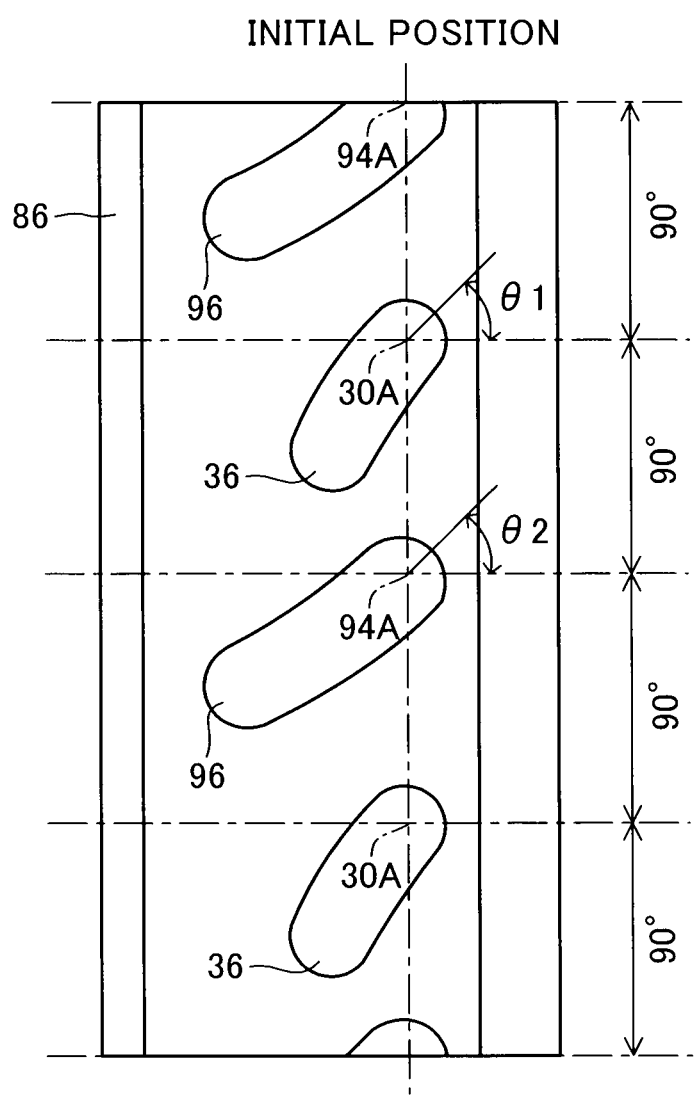
FIG. 11 is a development view in which an intermediate rotor of the fifth embodiment is developed on a plane.

FIG. 10 is an axially-taken sectional view showing a fifth embodiment of the motion conversion transmission apparatus according to the present invention and configured as a brake stroke simulator. FIG. 11 is a development view in which an intermediate rotor of the fifth embodiment is developed on a plane.

In the fifth embodiment, the input piston 14 is a substantially columnar member fitted into the intermediate rotor 86 and has a cylindrical recess 14B which extends in alignment with the axis 12 and opens toward the output piston 90. By contrast, the output piston 90 has a substantially columnar body portion fitted into the intermediate rotor 86, and a shaft portion 90B which has a circular cross section and projects from the body portion toward the input piston 14 while being aligned with the axis 12. The shaft portion 90B is inserted into the recess 14B in such a manner as to be displaceable along the axis 12 in relation to the recess 14B. The compression coil spring 92, which serves as reaction force generation means, is elastically attached between the output piston 90 and the end cap 22B. When the input piston 14 and the output piston 90 are positioned at their initial positions, the input piston 14 and the output piston 90 are in contact with each other in a mutually pressing condition.

Similar to the above-described second to fourth embodiments, each of the load transmission rods 30 and 94 is divided into two radially extending pieces. The individual load transmission rods 30 are supported in a cantilever fashion at their radially inner end portions by a portion of the input piston 14 around the recess 14B, whereas the individual load transmission rods 94 are supported in a cantilever fashion by the shaft portion 90B of the output piston 90. Similar to the above-described fourth embodiment, the load transmission rods 30 and 94 are positioned at the same axial position. Thus, these load transmission rods are alternately arranged in the circumferential direction about the axis 12 along a plane perpendicular to the axis 12 while being spaced 90° apart from one another.

Also, the input piston 14 has two slits 14C which are spaced 90o apart from the load transmission rods 30 about the axis 12 and which open toward the output piston 90. The load transmission rods 94 pass through the respective slits 14C in such a loose condition as to be rectilinearly movable along the axis 12 in relation to the input piston 14. Other configurational features of the fifth embodiment are similar to those of the above-described fourth embodiment.

Notably, also in the present embodiment, the load transmission rods 30 and the load transmission rods 94 may be located at mutually different axial positions. Furthermore, the paired load transmission rods 94 may assume the form of a single rod which extends diametrally through each of the shaft portion 90B of the output shaft 90 and the paired slits 14C of the input piston 14.

Even in the fifth embodiment, the first transmission means 54 and the second transmission means 56 function similar to those of the above-described first embodiment. Thus, the conversion and transmission of motion and the transmission of reaction force of the compression coil spring 92 among the input piston 14, the intermediate rotor 86, and the output piston 90 can be achieved similar to the above-described first embodiment. Also, the ratio of the amount of rectilinear motion of the output piston 90 to the amount of rectilinear motion of the input piston 14 exhibits a nonlinear characteristic as in the case of the above-described other embodiments.

Thus, according to the illustrated fifth embodiment, similar to the above-described first to fourth embodiments, rectilinear motion and force can be transmitted from the input piston 14 to the output piston 90 in accordance with a desired continuous nonlinear transmission characteristic over the entire range. Also, a desired continuous nonlinear transmission characteristic can be imparted to the change in the pedal reaction force with the amount of treading on the brake pedal 212.

Particularly, according to the illustrated fifth embodiment, the shaft portion 90B of the output piston 90 is inserted into the recess 14B of the input piston 14, whereby the shaft portion 90B and the recess 14B also guide relative motions of the input piston 14 and the output piston 90 along the axis 12. Thus, as compared with the above-described first and second embodiments, relative rectilinear motions of the input piston 14 and the output piston 90 can be carried out smoothly.

According to the illustrated fourth and fifth embodiments, the first transmission means 54 and the second transmission means 56 are provided at the same axial position along the axis 12 while being spaced apart from each other about the axis 12. Thus, as compared with the above-described first to third embodiments in which the first transmission means 54 and the second transmission means 56 are separated from each other along the axis 12, there can be lowered a prying force which acts on the intermediate rotor 86 in association with motion conversion conducted by the first transmission means 54 and the second transmission means 56, whereby the stroke simulator 10 can operate smoothly, and the durability of the stroke simulator 10 can be improved. Also, the length of the stroke simulator 10 along the axis 12 can be reduced, whereby the mountability of the stroke simulator 10 in a vehicle can be improved.

Also, as can be understood from the above description, in the first through fifth embodiments, the input piston 14, the intermediate rotor 86, the output piston 90 are fitted to each other while being aligned with the axis 12, and move relative to one another while being aligned with the axis 12. Therefore, as compared with the case where a link mechanism or the like is employed so as to attain a desired transmission characteristic for motion or force, the size of the stroke simulator 10, serving as a motion conversion transmission apparatus, can be reduced without fail.

Sixth Embodiment

Figure 18:
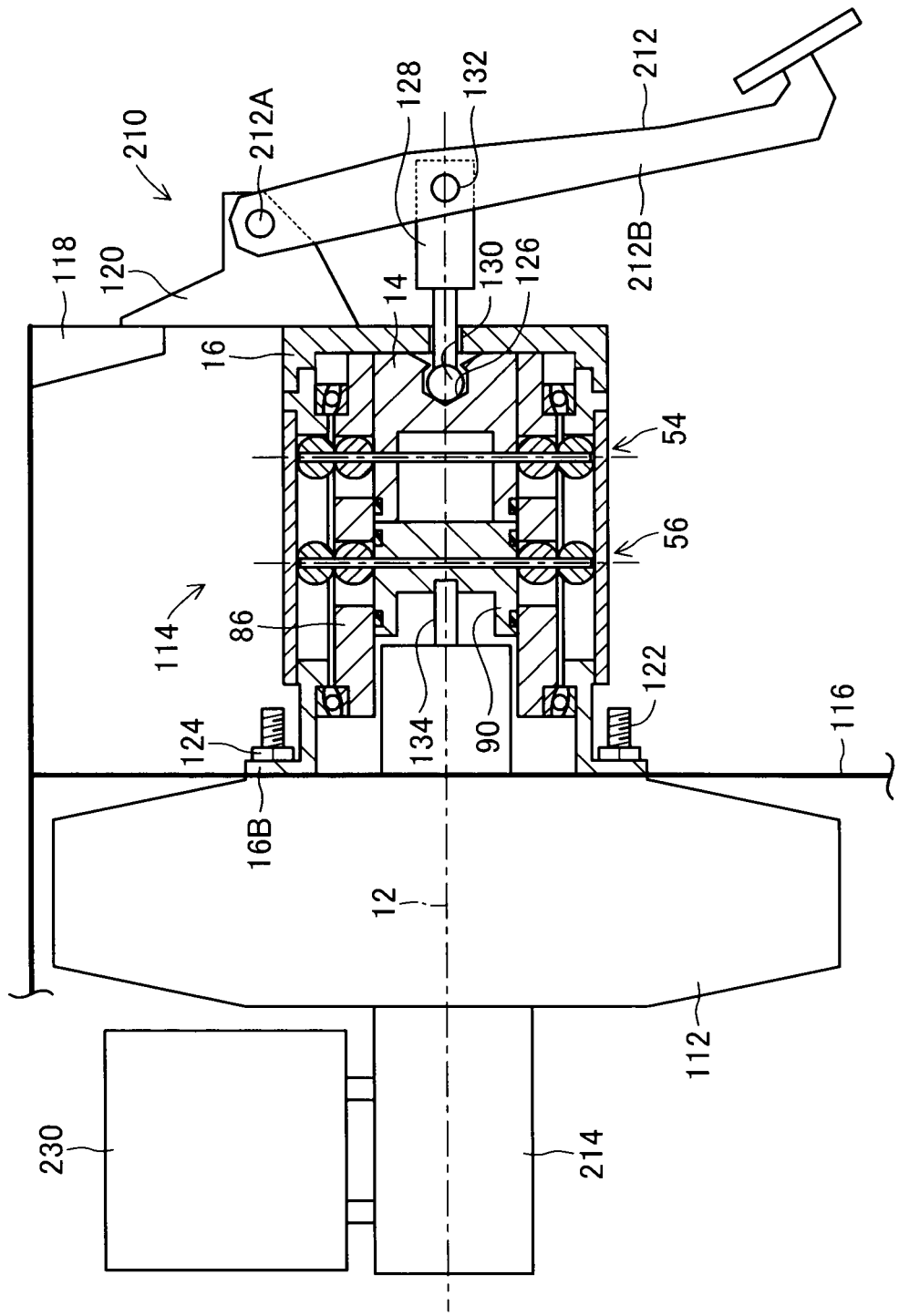
FIG. 18 is a sectional view showing a sixth embodiment of the motion conversion transmission apparatus according to the present invention and configured as a treading force transmission apparatus for a brake apparatus.
Figure 19:
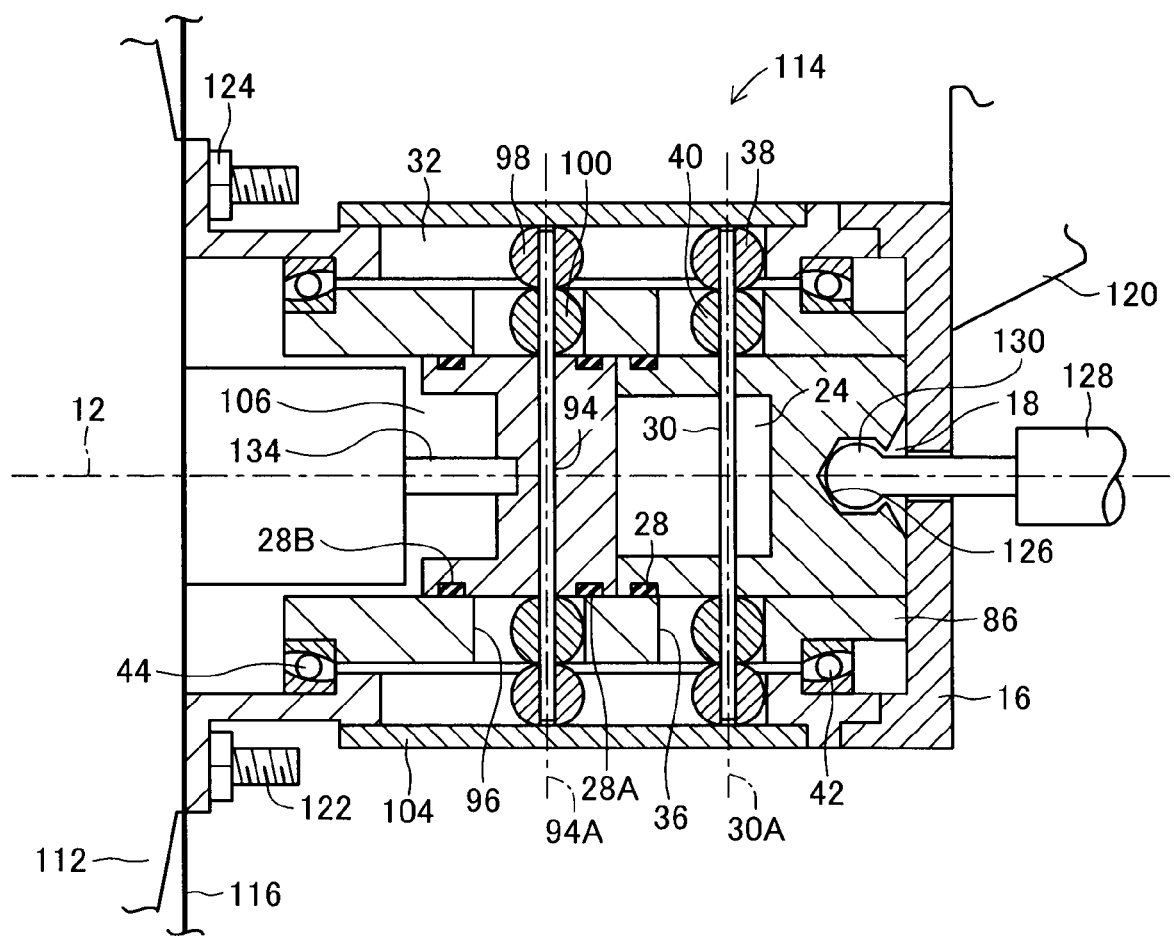
FIG. 19 is an axially-taken enlarged sectional view showing the treading force transmission apparatus of the sixth embodiment.

FIG. 18 is a sectional view showing a sixth embodiment of the motion conversion transmission apparatus according to the present invention and configured as a treading force transmission apparatus for a brake apparatus. FIG. 19 is an axially-taken enlarged sectional view showing the treading force transmission apparatus of the sixth embodiment.

In these drawings, a brake apparatus 210 includes a brake booster 112, and a treading force transmission apparatus 114 is disposed between the brake booster 112 and the brake pedal 212. The brake booster 112, the master cylinder 214, and the reservoir 230 are disposed on the side of a dashboard panel 116 opposite the brake pedal 212. A stay 118 is fixed to the dashboard panel 116, and the upper end of a bracket 120 is mounted to the stay 118 by use of unillustrated bolts. The lower end of the bracket 120 is fixed to the housing 16 of the treading force transmission apparatus 114 by means of welding or the like. The bracket 120 supports a pivot shaft 212A, which pivotably supports the brake pedal 212.

Although the treading force transmission apparatus 114 has substantially the same structure as the stroke simulator 10 of the first embodiment, the housing 16 has a squarish-C-shaped cross section which opens at one end and assumes the form of a cylinder which extends along the axis 12. A flange 16B is integrally formed at the open end of the housing 16. The flange 16B is mounted to the dashboard panel 116, together with the brake booster 112, by means of bolts 122 fixed to the brake booster 112 and nut 124 in screw engagement with the bolts 122.

The input piston 14 has a socket 126 formed in the right end thereof as viewed in FIG. 18, and a ball 130 provided at one end of a link 128 is fitted into the socket 126. Thus, the link 128 is connected at its one end to the piston 14 such that the link 128 is pivotable. The link 128 extends along the axis 12 through the end wall of the housing 16 and is pivotably connected at the other end to the arm portion 212B of the brake pedal 212 via a pivot pin 132. Antifriction rings 26 and 28, similar to the antifriction ring 28 of the first embodiment are attached to the outer circumferences of opposite ends of the input piston 14.

Further, in the present embodiment, a compression coil spring and an end cap corresponding to the compression coil spring 92 and the end cap 22B of the first embodiment are not provided; and the distal end of an operation rod 134 of the brake booster 112, which extends along the axis 12, is integrally connected to the output piston 90 by means of press fit or the like. None of the cylinder chambers is filled with oil, and a communication hole corresponding to the communication hole 41 is not provided in a cover 104. Except for the above, the present embodiment has the same configuration as the first embodiment.

In the illustrated sixth embodiment, when a driver treads on the brake pedal 212 while applying a treading force to the brake pedal 212, the input piston 14 is driven leftward as viewed in FIG. 18 along the axis 12. As a result of motion conversion performed by the first transmission means 54 and the second transmission means 56 in the same manner as in the first embodiment, the output piston 90 is driven leftward as viewed in FIG. 18 along the axis 12, whereby the operation rod 134 of the brake booster 112 is driven in a braking force increase direction.

Further, a reaction force generated as a result of supply of the brake hydraulic pressure from the master cylinder 214 to the wheel cylinders 222FL to 222RR is transmitted, as a hydraulic pressure, from the wheel cylinders to the brake booster 112 via the master cylinder 214, whereby the operation rod 134 is pressed rightward as viewed in FIG. 18, and the reaction force is transmitted to the input piston 14 in the same manner as in the first embodiment. The reaction force is then transmitted from the input piston 14 to the brake pedal 212 via the link 128.

In this case, since the first transmission means 54 and the second transmission means 56 function in the same manner as in the first embodiment, according to the illustrated sixth embodiment, similar to the above-described first to fifth embodiments, rectilinear motion and force can be transmitted from the input piston 14 to the output piston 90 in accordance with a desired continuous nonlinear transmission characteristic over the entire range. Also, a desired continuous nonlinear transmission characteristic can be imparted to the change in the pedal reaction force with the amount of treading on the brake pedal 212.

Particularly, according to the illustrated sixth embodiment, since the treading force transmission apparatus 114 is disposed between the brake booster 112 and the brake pedal 212, as in the case of a conventional pedal-ratio-variable-type brake pedal, a desired continuous nonlinear transmission characteristic can be imparted the relation between the magnitude of operation of the brake pedal by the driver and the amount of input displacement to the master cylinder or the brake booster.

Notably, in the first through sixth embodiments, the intermediate rotor 86 is supported by the housing 16 such that the intermediate rotor 86 can rotate within the housing 16; the input piston 14 and the output piston 90 are supported by the intermediate rotor 86 such that the input piston 14 and the output piston 90 can move rectilinearly; and the movable members and the reaction force generation member are not exposed to the outside of the housing 16. Therefore, as compared with the case where the output piston (movable member) and the reaction force generation member are exposed to the outside of the housing 16, good mountability to the vehicle or the like can be secured. Also, there can be reduced the possibility of operation failure, which would otherwise occur as a result of entry of foreign matter in the gap between the movable member and the housing.

Notably, in the first through third embodiments and the sixth embodiment, the first transmission means 54 and the second transmission means 56 are spaced apart from each other along the axis 12 at the same circumferential position about the axis 12. Thus, the load transmission rods 30 and 94 are positioned at the same circumferential position about the axis 12. The guide grooves 32 are common to the first transmission means 54 and the second transmission means 56. Thus, as compared with an embodiment in which guide grooves are provided for each of the first transmission means 54 and the second transmission means 56, the number of steps of machining the guide grooves 32 can be reduced.

Seventh Embodiment

Figure 20:
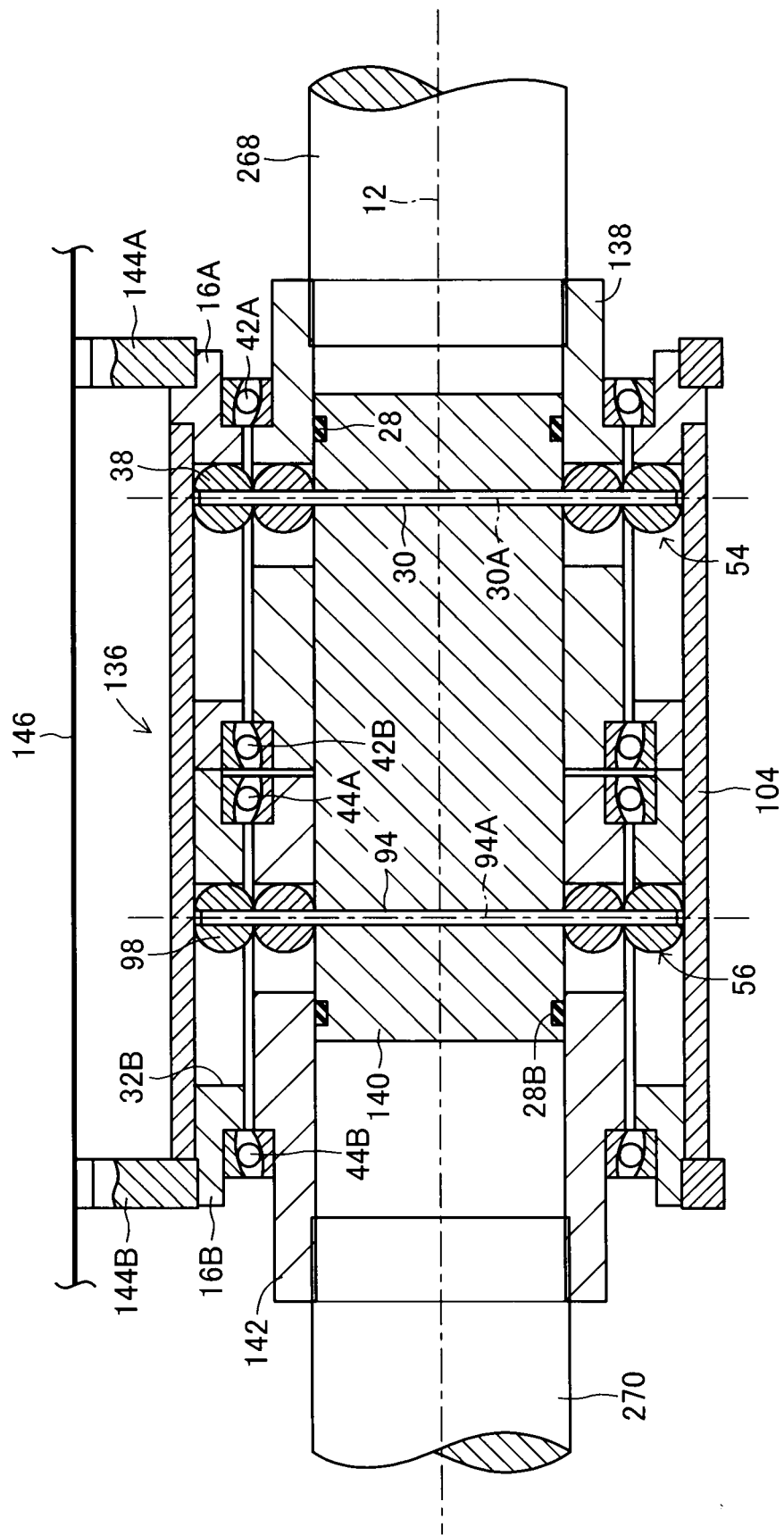
FIG. 20 is an axially-taken sectional view showing a seventh embodiment of the motion conversion transmission apparatus according to the present invention and configured as a steering motion conversion transmission apparatus for a steering system of a vehicle such as an automobile.
Figure 21:
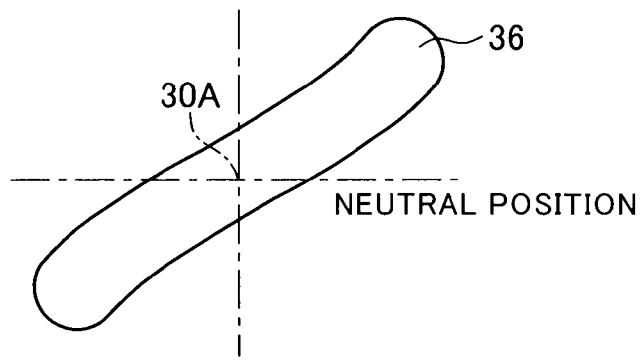
FIG. 21 is a partial development view in which a cam groove region of first transmission means of an input rotor of the seventh embodiment is developed on a plane.
Figure 22:
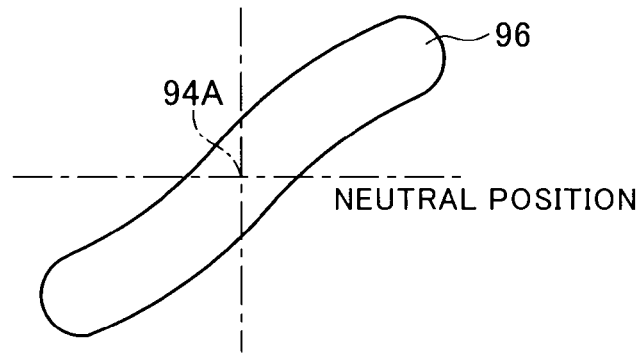
FIG. 22 is a partial development view in which a cam groove region of second transmission means of an output rotor of the seventh embodiment is developed on a plane.
Figure 23:
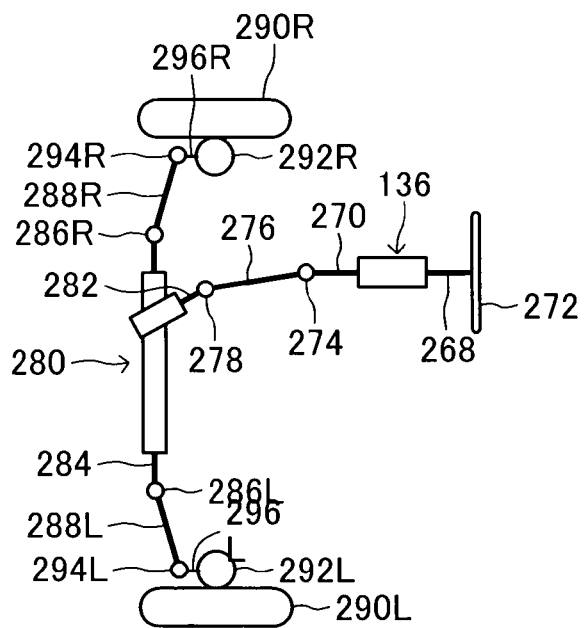
FIG. 23 is an explanatory view showing a steering system in which the seventh embodiment is incorporated.

FIG. 20 is an axially-taken sectional view showing a seventh embodiment of the motion conversion transmission apparatus according to the present invention and configured as a steering motion conversion transmission apparatus for a steering system of a vehicle such as an automobile. FIG. 21 is a partial development view in which a cam groove region of first transmission means of an input rotor of the seventh embodiment is developed on a plane. FIG. 22 is a partial development view in which a cam groove region of second transmission means of an output rotor of the seventh embodiment is developed on a plane. FIG. 23 is an explanatory view showing a steering system in which the seventh embodiment is incorporated.

As shown in FIG. 23, a steering motion conversion transmission apparatus 136 is disposed between an upper main shaft 268 and a lower main shaft 270, which are supported by a vehicle body, which is not illustrated in FIG. 23, such that the upper main shaft 268 and the lower main shaft 270 are rotatable about the axis 12. The upper end of the upper main shaft 268 is integrally connected to a steering wheel 272, and the lower end of the upper main shaft 268 is connected to the upper end of the steering motion conversion transmission apparatus 136. The upper end of the lower main shaft 270 is connected to the lower end of the steering motion conversion transmission apparatus 136, and the lower end of the lower main shaft 270 is connected to the upper end of an intermediate shaft 276 via a universal joint 274.

The lower end of the intermediate shaft 276 is connected to a pinion shaft 282 of a rack-and-pinion-type steering apparatus 280 via a universal joint 278. Opposite ends of a rack bar 284 of the steering apparatus 280 are connected to the inner ends of corresponding tie rods 288L and 288R via ball joints 286L and 286R. Outer ends of the tie rods 288L and 288R are connected via respective ball joints 294L and 294R to knuckle arms 296L and 296R of wheel support members 292L and 292R, which rotatably support steerable left and right wheels 290L and 290R.

Therefore, a steering torque and a steering rotary motion which are applied to the steering wheel 272 by a driver are transmitted from the upper main shaft 268 to the lower main shaft 270 via the steering motion conversion transmission apparatus 136. The steering torque and the rotary motion are then transmitted from the lower main shaft 270 to the pinion shaft 282 via the intermediate shaft 276. By means of the steering apparatus 280, the torque and rotary motion of the pinion shaft 282 are converted to a force and a rectilinear motion of the rack bar 284 along the lateral direction of the vehicle. By means of the tie rods 288L, 288R and the knuckle arms 296L and 296R, the force and rectilinear motion of the rack bar 284 along the lateral direction of the vehicle are converted to torques and rotary motions about unillustrated king pins. The torques and rotary motions are transmitted to the wheel support members 292L, 292R and the steerable wheels 290L and 290R, whereby the steerable wheels 290L and 290R are steered.

A steering reaction is transmitted from the steerable wheels 290L and 290R to the tie rods 288L and 288R and the rack bar 284, as an axial force, via the wheel support members 292L, 292R and the knuckle arms 296L and 296R. By means of the steering apparatus 280, the axis force of the rack bar 284 is converted to a torque of the pinion shaft 282. The torque of the pinion shaft 282 is transmitted to the steering wheel 272 via the intermediate shaft 276, the lower main shaft 270, the steering motion conversion transmission apparatus 136, the upper main shaft 268, and the steering wheel 272.

As shown in FIG. 20, the steering motion conversion transmission apparatus 136 of the seventh embodiment also includes first transmission means 54 and second transmission means 56 separated from each other along the axis 12. The first transmission means 54 includes an input rotor 138 rotatable about the axis 12, and an intermediate piston 140 reciprocatable along the axis 12. The second transmission means 56 includes the intermediate piston 140, and an output rotor 142 rotatable about the axis 12.

The input rotor 138 is supported by angular bearings 42A and 42B within a housing 16A such that the input rotor 138 can rotate about the axis 12 in relation to the housing 16A. Similarly, the output rotor 142 is supported by angular bearings 44A and 44B within a housing 16B such that the output rotor 142 can rotate about the axis 12 in relation to the housing 16B. The housings 16A and 16B are in contact with each other, and are connected together by means of a cylindrical cover 104 disposed on the outer sides of these housings. Further, the housings 16A and 16B are fixed to an instrument panel 146, which is a portion of the vehicle body, via mount brackets 144A and 144B, respectively.

The input rotor 138 and the output rotor 142 are slightly separated from each other along the axis 12. The input rotor 138 is integrally connected, at its end portion opposite the output rotor 142, to the lower end of the upper main shaft 268. The output rotor 142 is integrally connected, at its end portion opposite the input rotor 138, to the upper end of the lower main shaft 270. The intermediate piston 140 is disposed inside the input rotor 138 and the output rotor 142 and supported by the input rotor 138 and the output rotor 142 such that the intermediate piston 140 can reciprocate along the axis 12 in relation thereto.

A load transmission rod 30 of the first transmission means 54 and a load transmission rod 94 of the second transmission means 56 are fixed to the intermediate piston 140 such that the rods are separated from each other along the axis 12. The axis 30A of the load transmission rod 30 and the axis 94A of the load transmission rod 94 are located on a common plane. Guide rollers 38 of the first transmission means 54 are rollably engaged with the wall surfaces of guide grooves 32A provided in the housing 16A. Guide rollers 98 of the second transmission means 56 are rollably engaged with the wall surfaces of guide grooves 32B provided in the housing 16B. Antifriction rings 28A and 28B, similar to the antifriction rings 28, 28A, and 28B of the first embodiment are attached to the outer circumferences of opposite end portions of the intermediate piston 140.

Further, as shown in FIG. 21, the cam groves 36 of the first transmission means 54 each assumes a S-like shape which is formed by connecting two cam grooves curved in a direction opposite the direction in which the cam grooves 36 of the first embodiment is curved. When the steering wheel 272 is located at the neutral position; i.e., when the vehicle travels straight, the axis 30A of the load transmission rod 30 is located at the neutral position corresponding to the centers of the cam groves 36. As shown in FIG. 22, the cam groves 96 of the second transmission means 56 each assumes a S-like shape which is formed by connecting two cam grooves curved in the same direction as the cam grooves 36 of the first embodiment. When the steering wheel 272 is located at the neutral position, the axis 94A of the load transmission rod 94 is located at the neutral position corresponding to the centers of the cam groves 96. As can be understood through comparison between FIGS. 21 and 22, in the vicinity of the neutral position, the inclination angle of the cam groove 36 in relation to the circumferential direction is set to a valve smaller than the inclination angle of the cam groove 96. Except for the above, the seventh embodiment has the same configuration as the first embodiment.

In the seventh embodiment, a direction in which the steering wheel 272 is rotated so as to turn the vehicle rightward is defined as a positive rotation direction. When the upper main shaft 268 rotates in the positive direction about the axis 12 as a result of rotation of the steering wheel 272 in the positive direction, the input rotor 138 also rotates in the positive direction about the axis 12. The first transmission means 54 converts the rotation of the input rotor 138 in the positive direction to a leftward rectilinear motion along the axis 12 as viewed in FIG. 20, and transmits the leftward rectilinear motion to the intermediate piston 140. The second transmission means 56 converts the leftward rectilinear motion of the intermediate piston 140 to a rotation in the positive direction about the axis 12, and transmits the rotation to the output rotor 142. Thus, the lower main shaft 270 rotates in the positive direction about the axis 12.

When the steering wheel 272 is rotated so as to turn the vehicle leftward, the input rotor 138 and the output rotor 142 rotate in the negative direction opposite the above-described direction, and the intermediate piston 140 moves rectilinearly rightward as viewed in FIG. 20. Except for this, the rotational motion of the steering wheel 272 is transmitted to the lower main shaft 270 via the steering motion conversion transmission apparatus 136 in the same manner.

Figure 24:
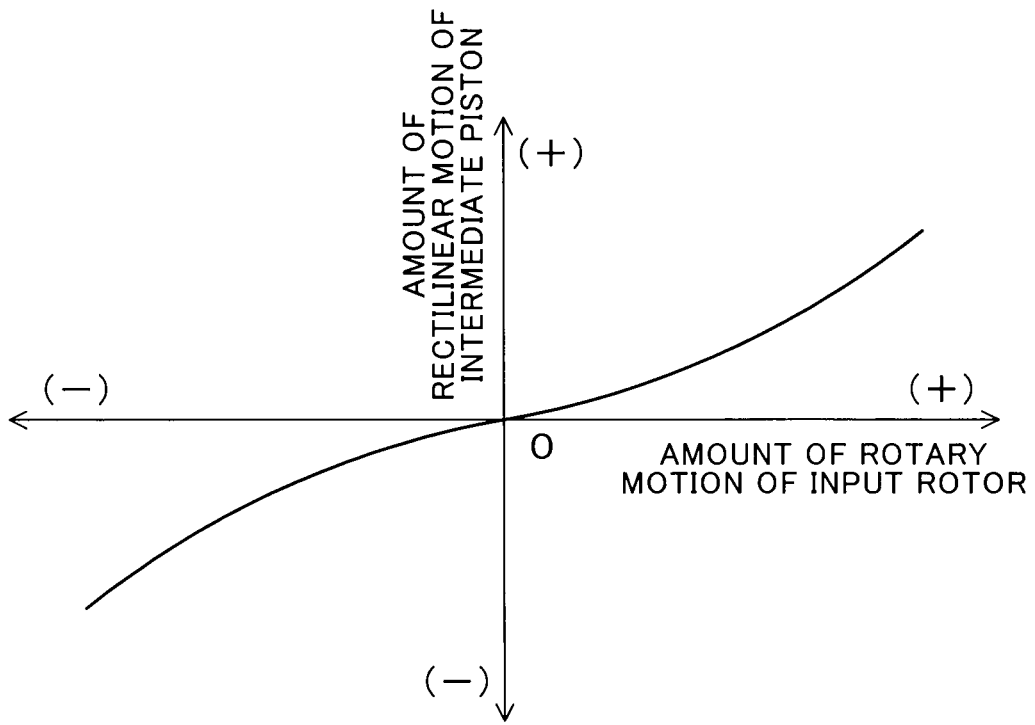
FIG. 24 is a graph showing the relation between the amount of rotary motion of the input rotor and the amount of rectilinear motion of the intermediate piston in the seventh embodiment.
Figure 25:
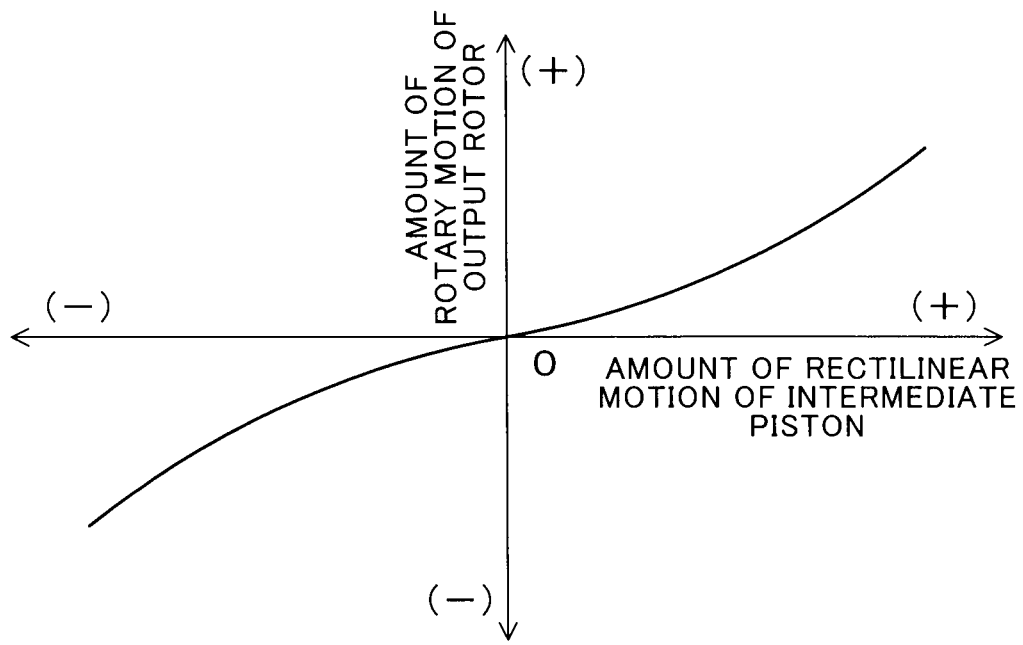
FIG. 25 is a graph showing the relation between the amount of rectilinear motion of the intermediate piston and the amount of rotary motion of the output rotor in the seventh embodiment.

In these cases, each of the cam grooves 36 and 96 assumes a S-like shape. Therefore, when the play of the steering system in the rotational direction is ignored, a relation as shown in FIG. 24 is present between the amount of rotary motion of the input rotor 138 and the amount of rectilinear motion of the intermediate piston 140; and a relation as shown in FIG. 25 is present between the amount of rectilinear motion of the intermediate piston 140 and the amount of rotary motion of the output rotor 142. As can be understood from FIGS. 24 and 25, each of the first transmission means 54 and the second transmission means 56 has a nonlinear characteristic irrespective of whether the steering wheel 272 is rotated in the positive direction or the negative direction. That is, with a rotational position corresponding to the neutral position of the steering wheel 272 being regarded as a reference position, the ratio of the amount of motion of a motion transmission destination member to the amount of motion of a motion transmission source member gradually increases with the amount of motion of the motion transmission source member.

Figure 26:
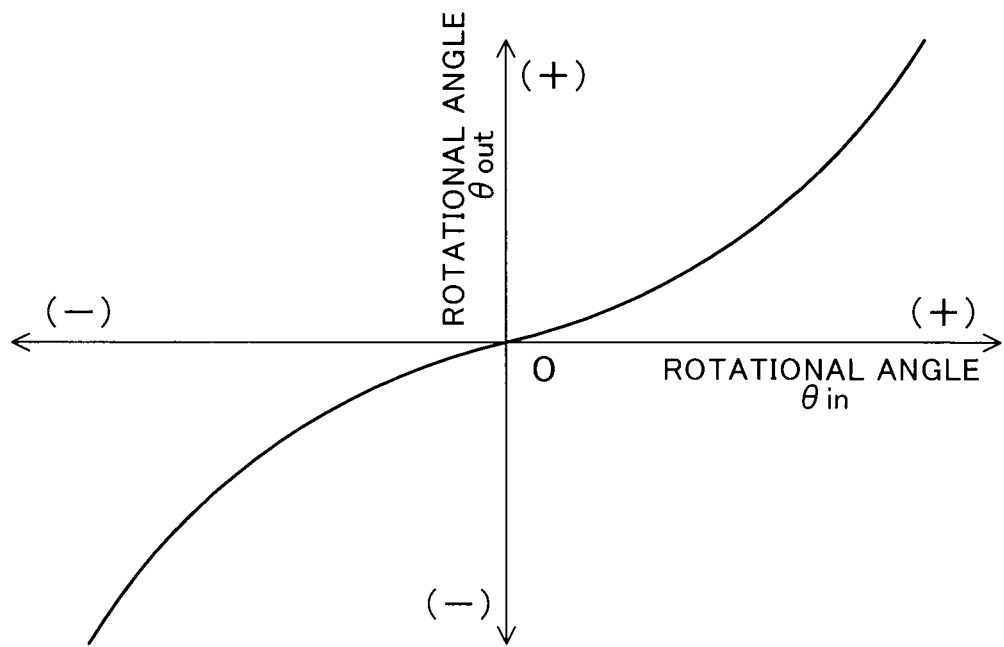
FIG. 26 is a graph showing the relation between rotational angle θin of a steering wheel from its neutral position and rotational angle θout of a lower main shaft 270 in the seventh embodiment.
Figure 27:
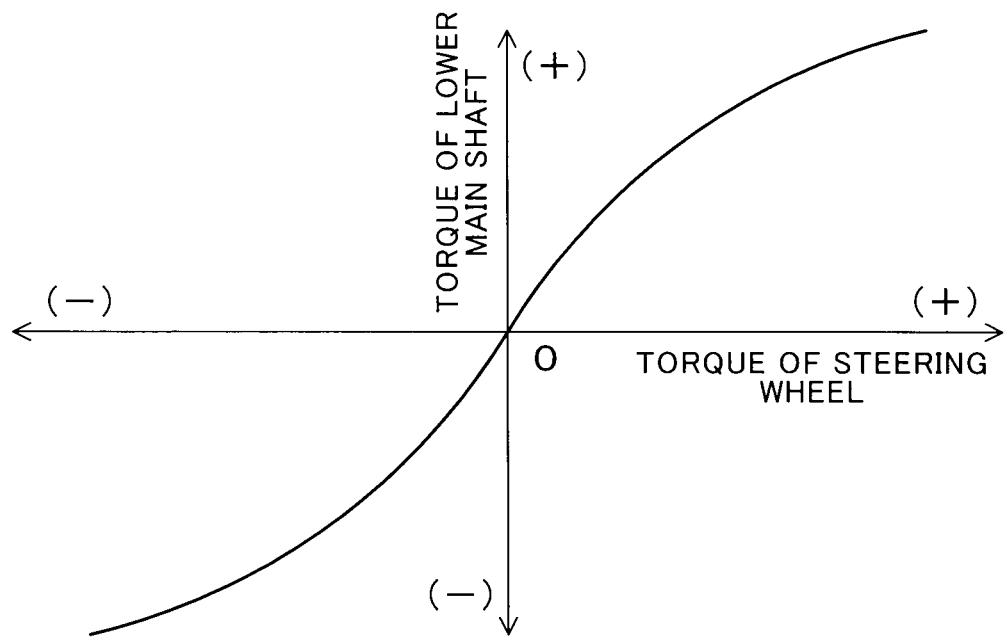
FIG. 27 is a graph showing a transmission characteristic for torque which is transmitted from the steering wheel to the lower main shaft via the steering motion conversion transmission apparatus in the seventh embodiment.

According, a relation as shown in FIG. 26 is present between the rotational angle θin of the steering wheel 272 from the neutral position and the rotational angle θout of the lower main shaft 270. That is, in both the case where the steering wheel 272 is rotated in the positive direction and the case where the steering wheel 272 is rotated in the negative direction, the ratio of the amount of rotary motion of the lower main shaft 270 to the amount of rotary motion of the steering wheel 272 increases continuously and nonlinearly as the amount of rotary motion of the steering wheel 272 increases. Notably, FIG. 27 shows the transmission characteristic of torque transmitted from the steering wheel 272 to the lower main shaft 270 via the steering motion conversion transmission apparatus 136.

Thus, in the illustrated seventh embodiment, through proper setting of the shapes of the cam grooves 36 and 96 in accordance with a desired transmission characteristic, rotary motion and force can be transmitted from the input rotor 138 to the output rotor 142 in accordance with a desired continuous nonlinear transmission characteristic over the entire range. Thus, steering motion and steering force can be transmitted from the steering wheel 272 to the steerable wheels in accordance with a desired continuous nonlinear transmission characteristic over the entire range.

Particularly, in the illustrated seventh embodiment, since the ratio of the amount of rotary motion of the lower main shaft 270 to the amount of rotary motion of the steering wheel 272 increases continuously and nonlinearly with the amount of rotary motion of the steering wheel 272, the ratio of the steering amount of the steerable wheels to the amount of rotary motion of the steering wheel 272 can be increased continuously and nonlinearly with the amount of rotary motion of the steering wheel 272. Accordingly, the steering gear ratio can be set such that the steering gear ratio assumes a value smaller than 1 when the steering wheel 272 is in the vicinity of the neutral position, and assumes a value larger than that in the case of a conventional typical steering apparatus when the steering angle of the steering wheel 272 is large. Thus, as compared with the conventional typical steering apparatus, better maneuvering stability can be secured when the vehicle travels straight, and maneuverability at the time of stationary steering or the like can be improved.

Eighth Embodiment

Figure 28:
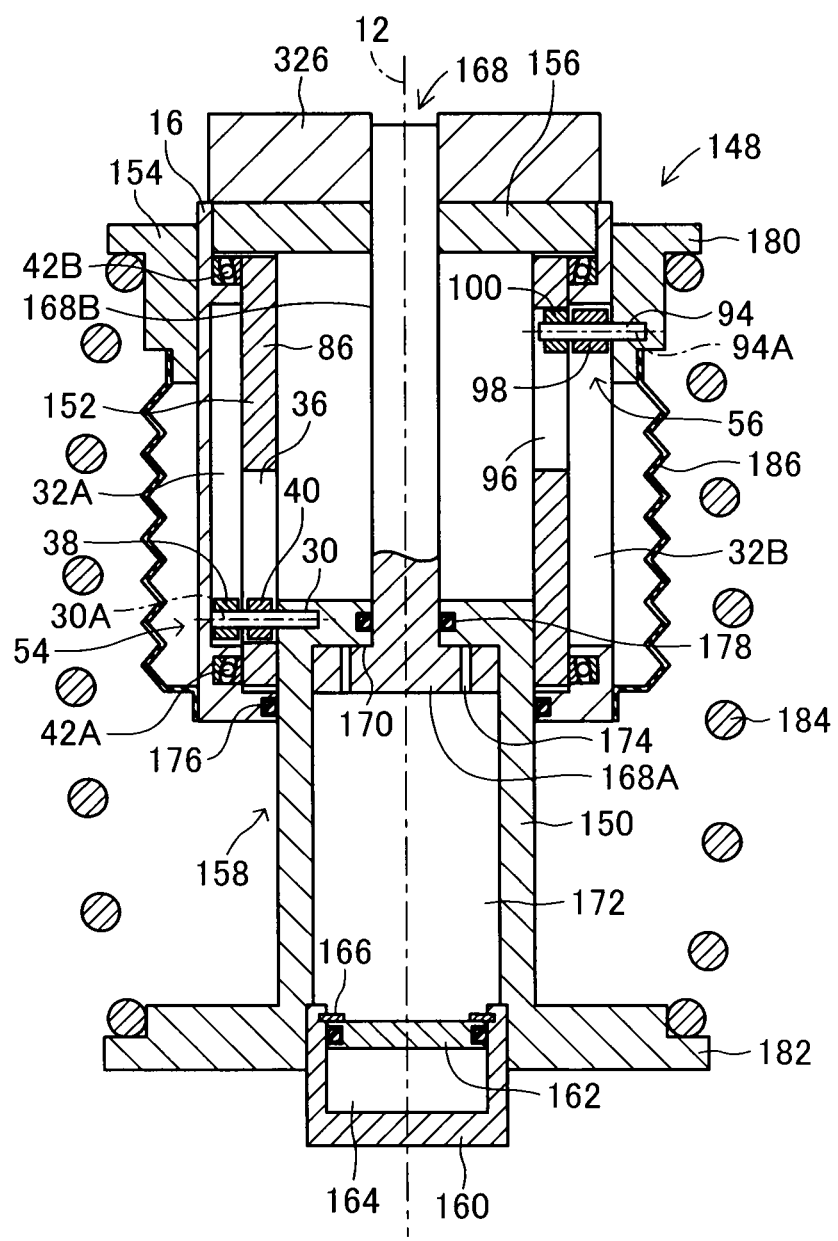
FIG. 28 is a sectional view cut along two cutting planes which cross at right angles on the axis, showing an eighth embodiment of the motion conversion transmission apparatus according to the present invention and configured as a suspension stroke transmission apparatus for a vehicle such as an automobile.
Figure 29:
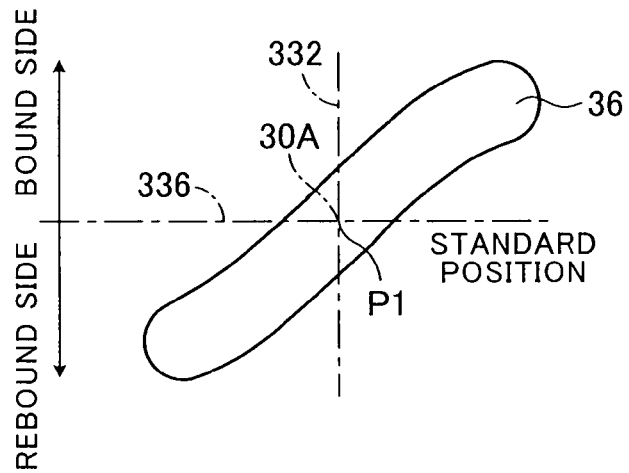
FIG. 29 is a partial development view in which a cam groove region of first transmission means of an intermediate rotor of the eighth embodiment is developed on a plane.
Figure 30:
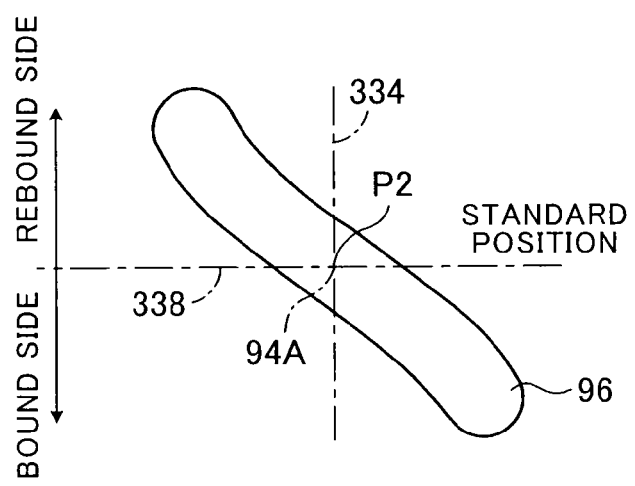
FIG. 30 is a partial development view in which a cam groove region of second transmission means of the intermediate rotor of the eighth embodiment is developed on a plane.
Figure 31:
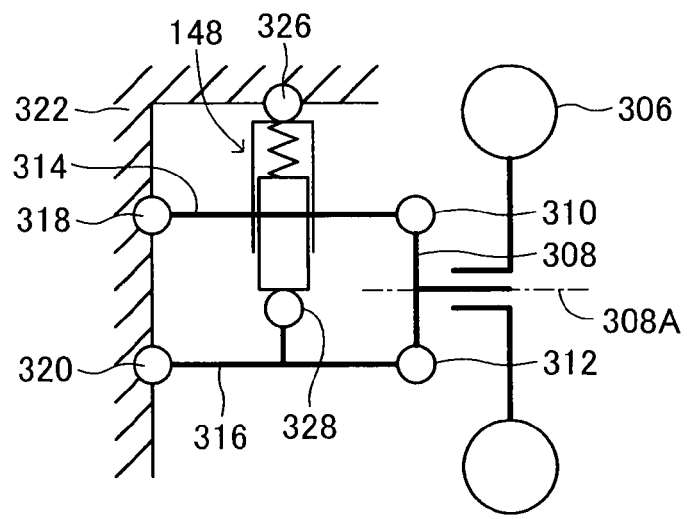
FIG. 31 is an explanatory view showing a suspension in which the eighth embodiment is incorporated.

FIG. 28 is a sectional view cut along two cutting planes which cross at right angles on the axis, showing an eighth embodiment of the motion conversion transmission apparatus according to the present invention and configured as a suspension stroke transmission apparatus for a vehicle such as an automobile. FIG. 29 is a partial development view in which a cam groove region of first transmission means of an intermediate rotor of the eighth embodiment is developed on a plane. FIG. 30 is a partial development view in which a cam groove region of second transmission means of the intermediate rotor of the eighth embodiment is developed on a plane. FIG. 31 is an explanatory view showing a suspension in which the eighth embodiment is incorporated.

In FIG. 31, reference numeral 306 denotes a wheel, which is supported by a wheel support member 308 such that the wheel can rotate about a rotation axis 308A. The suspension shown in FIG. 31 is a double-wishbone-type suspension. Outer ends of an upper arm 314 and a lower arm 316 are pivotally attached to upper and lower ends of the wheel support member 308 by means of ball joints 310 and 312, respectively. Inner ends of the upper arm 314 and the lower arm 316 are pivotally attached to a vehicle body 322 by means of rubber bush devices 318 and 320, respectively. A suspension stroke transmission apparatus 148 of an eighth embodiment is disposed between the lower arm 316 and the vehicle body 322. Upper and lower ends of the suspension stroke transmission apparatus 148 are pivotally attached to the vehicle body 322 and the lower arm 316 by means of an upper mount 326 and a ball joint 328, respectively.

As shown in FIG. 28, the suspension stroke transmission apparatus 148 has a first transmission means 54 and a second transmission means 56, which are spaced apart from each other along an axis 12. The first transmission means 54 has an input piston 150, which is reciprocally movable along the axis 12, and an intermediate rotor 152, which is rotatable about the axis 12. The second transmission means 56 has the intermediate rotor 152 and an output piston 154, which is reciprocally movable along the axis 12.

The intermediate rotor 152 is supported at the inside of a housing 16 by angular bearings 42A and 42B in such a manner as to be rotatable about the axis 12 in relation to the housing 16. The output piston 154 assumes such a cylindrical shape as to be fitted to and surround the housing 16, and is supported in such a manner as to be reciprocally movable along the axis 12 in relation to the housing 16. An end cap 156 is fixed to the upper end of the housing 16 by means of press fit or the like. The end cap 156 is connected to the vehicle body 322 via the upper mount 326 fixed to the end cap 156.

The input piston 150 is fitted into the intermediate rotor 152 and is supported by the housing 16 and the intermediate rotor 152 in such a manner as to be reciprocally movable along the axis 12 in relation to the intermediate rotor 152. In the illustrated embodiment, the suspension stroke transmission apparatus 148 is a suspension stroke transmission apparatus in which a shock absorber is incorporated. The input piston 150 assumes a downwardly open cylindrical shape and functions as a cylinder of a shock absorber 158.

An end cap 160 is fixed to the lower end of the input piston 150 by means of press fit or the like and assumes an upwardly open closed-bottomed cylindrical shape. A free piston 162 is disposed within the end cap 160 in such a manner as to be reciprocally movable along the axis 12. The free piston 162 defines a gas chamber 164 in cooperation with the end cap 160. A high-pressure gas is sealed in the gas chamber 164. A C-ring 166 is attached to the inner surface of the upper end of the end cap 160. The C-ring 166 prevents the free piston 162 from moving upward beyond the same. Although unillustrated in FIG. 28, the ball joint 328 is provided at the lower end of the end cap 160.

The input piston 150 receives a piston 168 of the shock absorber 158 in such a manner that the piston 168 is reciprocally movable along the axis 12. The piston 168 defines a cylinder upper chamber 170 and a cylinder lower chamber 172 in cooperation with the input piston 150. A viscous liquid, such as oil, is sealed in the cylinder upper chamber 170 and the cylinder lower chamber 172. In FIG. 28, the suspension stroke transmission apparatus 148 is in a free state; i.e., in a state in which the weight of a vehicle body is not imposed between the upper mount 326 and the input piston 150. In the free state, the piston 168 of the shock absorber 158 is in a most expanded state in relation to the input piston 150, which serves as a cylinder for the piston 168; accordingly, the volume of the cylinder upper chamber 170 is zero.

A piston portion 168A of the piston 168 has a plurality of orifices 174 for allowing communication between the cylinder upper chamber 170 and the cylinder lower chamber 172. A rod portion 168B of the piston 168 extends upward through the end wall of the input piston 150 along the axis 12 and is connected at its upper end to the upper mount 326. An O-ring seal 176 is disposed between the input piston 150 and the housing 16. An O-ring seal 178 is disposed between the input piston 150 and the rod portion 168B of the piston 168.

The upper end of the output piston 154 has an integrally formed upper spring seat 180, which projects radially outward and extends annularly around the axis 12. The lower end of the input piston 150 has an integrally formed lower spring seat 182, which projects radially outward and extends annularly around the axis 12. A compression coil spring 184, which serves as a suspension spring, is elastically attached between the upper spring seat 180 and the lower spring seat 182 while surrounding the suspension stroke transmission apparatus 148 and extending along the axis 12.

A dust boot 186 is disposed at the outside of the suspension stroke transmission apparatus 148 and at the inside of the suspension spring. The dust boot 186 is connected at its upper end to the lower end of the output piston 154 and at its lower end to the lower end of the housing 16. Although unillustrated in FIG. 28, a stopper is provided at the upper end of the housing 16 so as to restrict upward movement, in FIG. 28, of the output piston 154; and accordingly, upward movement of the upper spring seat 180 as well.

The first transmission means 54 has load transmission rods 30, which are supported in a cantilever fashion by the upper end of the input piston 150 by means of press fit or the like at positions spaced 180° apart from each other about the axis 12, and which extend radially outward. Distal end portions of the load transmission rods 30 extend through cam grooves 36 provided in the intermediate rotor 152 and into guide grooves 32A provided in a cylindrical portion of the housing 16. The distal end portions of the load transmission rods 30 support substantially spherical guide rollers 38 and cam rollers 40 in such a manner that the guide rollers 38 and the cam rollers 40 are rotatable about axes 30A of the load transmission rods 30. The guide rollers 38 are rollably engaged with wall surfaces of the corresponding guide grooves 32A. The cam rollers 40 are rollably engaged with wall surfaces of the corresponding cam grooves 36.

Similarly, the second transmission means 56 has load transmission rods 94, which are supported in a cantilever fashion by a lower end portion of the output piston 154 by means of press fit or the like at positions spaced 1800 apart from each other about the axis 12, and which extend radially outward. Distal end portions of the load transmission rods 94 extend through guide grooves 32B provided in the cylindrical portion of the housing 16 and into cam grooves 96 provided in the intermediate rotor 152. The distal end portions of the load transmission rods 94 support substantially spherical guide rollers 98 and cam rollers 100 in such a manner that the guide rollers 98 and the cam rollers 100 are rotatable about axes 94A of the load transmission rods 94. The guide rollers 98 are rollably engaged with wall surfaces of the corresponding guide grooves 32B. The cam rollers 100 are rollably engaged with wall surfaces of the corresponding cam grooves 96.

In FIGS. 29 and 30, reference numerals 332 and 334 denote reference lines of the cam grooves 36 and 96, respectively, with respect to the direction of the axis 12. Reference numerals 336 and 338 denote reference lines of the cam grooves 36 and 96, respectively, with respect to a circumferential direction. As shown in FIG. 29, the cam groove 36 assumes a shape resembling the letter S. As shown in FIG. 30, the cam groove 96 assumes a shape resembling the inverted letter S such that the inclination direction of the cam groove 96 is the reverse of that of the cam groove 36. FIG. 28 shows the suspension stroke transmission apparatus 148 in a state in which a compressive force is not imposed on the suspension stroke transmission apparatus 148. However, when the vehicle carries a standard carrying load, and the wheel 306 is positioned at its neutral position; i.e., the wheel 306 neither bounds nor rebounds, the axes 30A and 94A of the load transmission rods 30 and 94 are positioned at central standard positions of the cam grooves 36 and 96, respectively; i.e., at intersections P1 and P2 of the reference lines 332 and 334 and the reference lines 336 and 338, respectively.

In FIGS. 29 and 30, a portion of the cam groove 36 located above the reference line 336 corresponds to a bound stroke of the wheel 306, and a portion of the cam groove 36 located below the reference line 3316 corresponds to a rebound stroke of the wheel 306. By contrast, a portion of the cam groove 96 located above the reference line 338 corresponds to a rebound stroke of the wheel 306, and a portion of the cam groove 96 located below the reference line 338 corresponds to a bound stroke of the wheel 306.

As shown in FIG. 29, the cam groove 362 extends while being inclined with respect to the reference lines 332 and 336 and is curved such that, as the distance from the intersection P1 increases, an angle of inclination with respect to the circumferential reference line 336 gradually decreases. Particularly, in the range of distance from the intersection P1 which corresponds to an area of a bound stroke and a rebound stroke of the wheel 306 excluding terminal areas of the bound and rebound strokes, a portion of the cam groove 36 located on a side toward a bound of the wheel 306 is set larger in angle of inclination with respect to the circumferential reference line 336 than is a portion of the cam groove 36 located on a side toward a rebound of the wheel 306. However, in the ranges of distance from the intersection P1 which correspond to the terminal areas of a bound stroke and a rebound stroke of the wheel 306, a portion of the cam groove 36 located on the side toward a bound of the wheel 306 is set smaller in angle of inclination with respect to the circumferential reference line 336 than is a portion of the cam groove 36 located on the side toward a rebound of the wheel 306.

As is apparent from comparison between FIG. 29 and FIG. 30, the cam groove 96 assumes a form obtained by inverting the cam groove 36 with respect to the circumferential reference line 332 and reversing the direction of curve. Accordingly, the cam groove 96 assumes a form obtained by rotating the cam groove 36 90° counterclockwise about the intersection P1.

Specifically, as shown in FIG. 30, the cam groove 96 extends while being inclined with respect to the reference lines 334 and 338 in the reverse direction of the cam groove 36 and is curved such that, as the distance from the intersection P2 increases, an angle of inclination with respect to the circumferential reference line 336 gradually increases. Particularly, in the range of distance from the intersection P2 which corresponds to an area of a bound stroke and a rebound stroke of the wheel 306 excluding terminal areas of the bound and rebound strokes, a portion of the cam groove 96 located on a side toward a bound of the wheel 306 is set smaller in angle of inclination with respect to the circumferential reference line 338 than is a portion of the cam groove 96 located on a side toward a rebound of the wheel 306. However, in the ranges of distance from the intersection P2 which correspond to the terminal areas of a bound stroke and a rebound stroke of the wheel 306, a portion of the cam groove 106 located on the side toward a bound of the wheel 306 is set larger in angle of inclination with respect to the circumferential reference line 338 than is a portion of the cam groove 96 located on the side toward a rebound of the wheel 306.

Each of the cam rollers 40 can move only in the cam groove 36 along an S-shaped motion locus, which is inclined with respect to the reference lines 332 and 336, except for rotary motion about the load transmission rod 30. Similarly, each of the cam rollers 100 can move only in the cam groove 96 along an S-shaped motion locus, which is inclined with respect to the reference lines 334 and 338, except for rotary motion about the load transmission rod 94.

In the illustrated eighth embodiment, when the wheel 306d bounds, and the input piston 150 rectilinearly moves upward along the axis 12 in relation to the intermediate rotor 152 and the housing 16, the first transmission means 54 converts a rectilinear motion of the input piston 150 to a rotary motion about the axis 12 and transmits the rotary motion to the intermediate rotor 152. Since the cam grooves 36 and 96 are curved into a S-like shape in opposite directions as mentioned above, the second transmission means 56 converts the rotary motion of the intermediate rotor 152 to a rectilinear motion that is the reverse of the rectilinear motion of the input piston 150, and transmits the reverse rectilinear motion to the output piston 154. Consequently, the upper spring seat 180 is displaced downward in relation to the housing 16.

When the wheel 306 bounds, and the input piston 150 rectilinearly moves downward along the axis 12 in relation to the intermediate rotor 152 and the housing 16, the first transmission means 54 and the second transmission means 56 perform conversion and transmission of motion in a manner similar to that in the case of bound of the wheel 306 except that the direction of rotary motion of the intermediate rotor 152 and the direction of rectilinear motion of the output piston 154 are reversed. Consequently, the upper spring seat 180 is displaced upward in relation to the housing 16.

Figure 32:
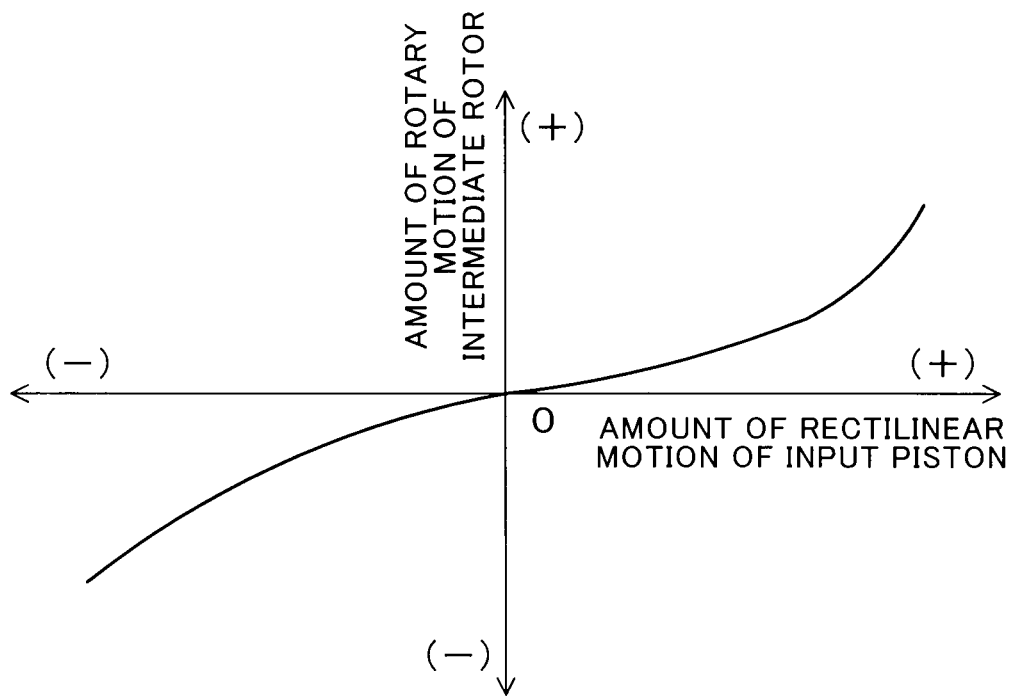
FIG. 32 is a graph showing the relation between the amount of rectilinear motion of an input rotor and the amount of rotary motion of an intermediate piston in the eighth embodiment.
Figure 33:
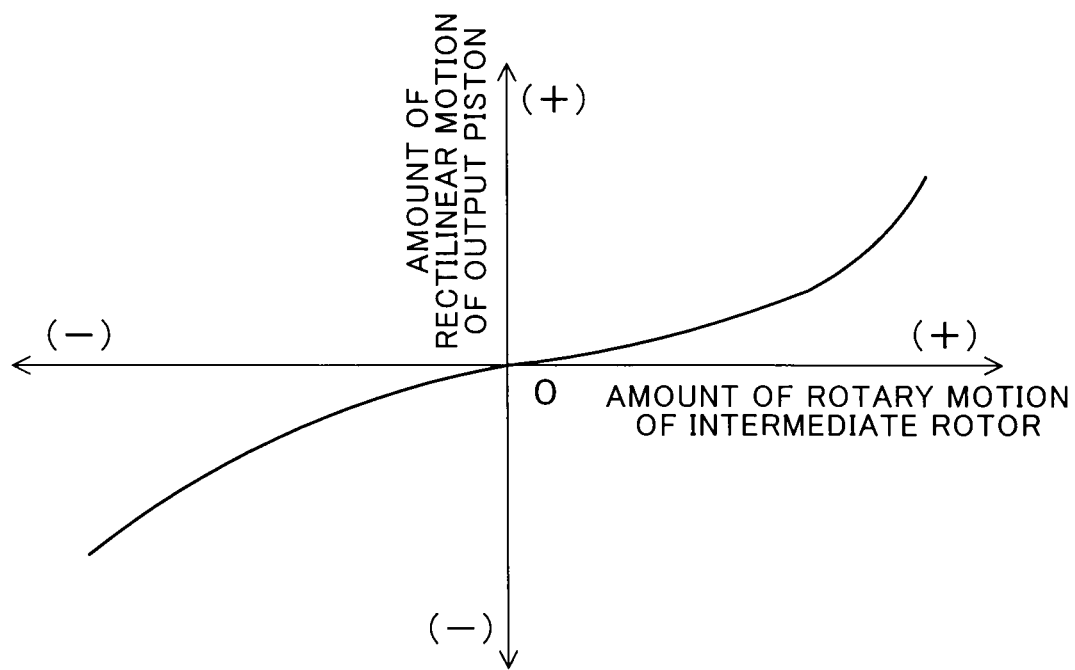
FIG. 33 is a graph showing the relation between the amount of rotary motion of the intermediate piston and the amount of rectilinear motion of an output rotor in the eighth embodiment.
Figure 34:
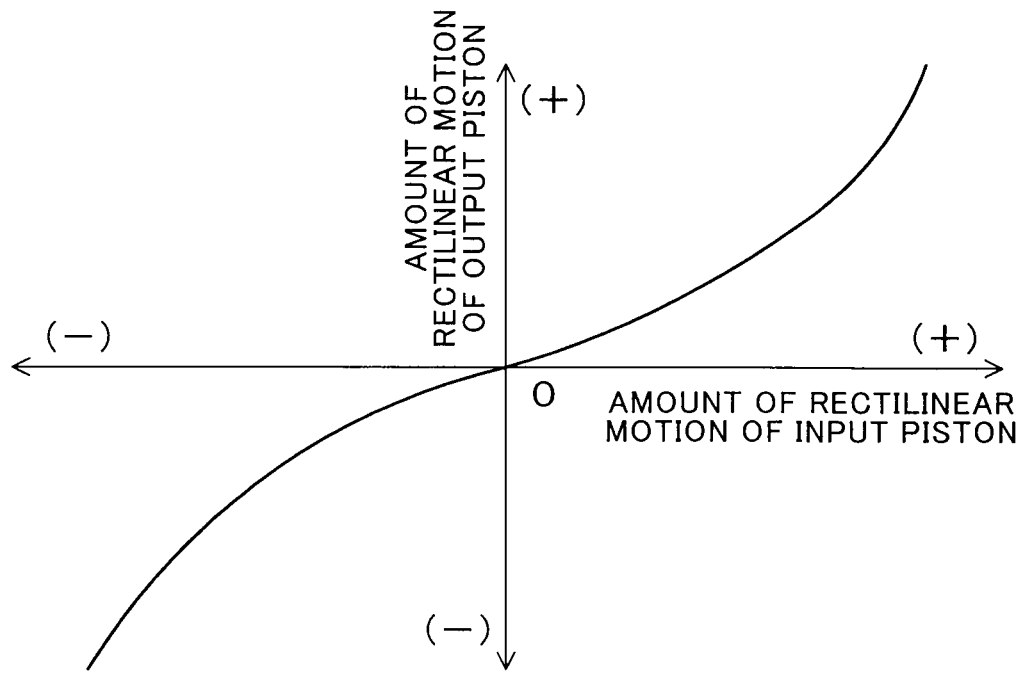
FIG. 34 is a graph showing the relation between the amount of rectilinear motion of the input rotor and the amount of rectilinear motion of the output rotor in the eighth embodiment.

Accordingly, when the directions of motions of members at the time of bound of the wheel 306 are taken as positive directions, the relation between the amount of rectilinear motion of the input piston 150 and the amount of rotary motion of the intermediate rotor 152 becomes as shown in FIG. 32. Also, the relation between the amount of rotary motion of the intermediate rotor 152 and the amount of rectilinear motion of the output piston 154 becomes as shown in FIG. 33. Thus, the relation between the amount of rectilinear motion of the input piston 150 and the amount of rectilinear motion of the output piston 154 becomes as shown in FIG. 34. In either case of bound and rebound of the wheel 306, the rate of increase in the amount of rectilinear motion of the output piston 154 gradually increases with the amount of rectilinear motion of the input piston 150.

In the case of bound of the wheel 306, the input piston 150 moves upward, and thus the lower spring seat 182 also moves upward; however, the upper spring seat 180 moves downward in relation to the housing 16. Thus, as compared with the case where the upper spring seat 180 does not move downward, the amount of compressive deformation of the compression coil spring 184 increases. By contrast, in the case of rebound of the wheel 306, the input piston 150 moves downward, and thus the lower spring seat 182 also moves downward; however, the upper spring seat 180 moves upward in relation to the housing 16. Thus, as compared with the case where the upper spring seat 180 does not move upward, the amount of decrease in the amount of compressive deformation of the compression coil spring 184 increases.

Figure 35:
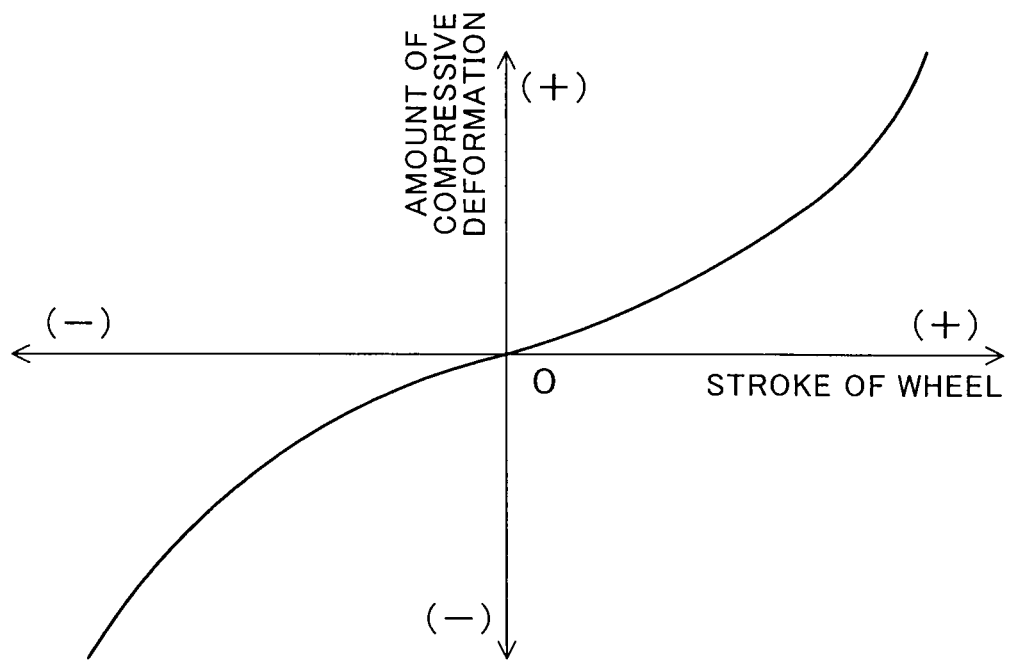
FIG. 35 is a graph showing the relation between stroke of a wheel and the amount of elastic deformation of a compression coil spring in the eighth embodiment.

Accordingly, the relation between a stroke of the wheel 306 and the amount of compressive deformation of the compressive coil spring 184 becomes as shown in FIG. 35. Specifically, in the case of bound of the wheel 306, as a bound stroke of the wheel 306 from the neutral position increases, the amount of compressive deformation of the compression coil spring 184 gradually increases, and the rate of increase in the amount of compressive deformation of the compression coil spring 184 also gradually increases. In the case of rebound of the wheel 306, as a rebound stroke of the wheel 306 from the neutral position increases, the amount of compressive deformation of the compression coil spring 184 gradually decreases, and the rate of decrease in the amount of compressive deformation of the compression coil spring 184 gradually increases.

As is apparent from comparison between the first quadrant and the third quadrant of FIG. 35, in an area of a bound stroke and a rebound stroke of the wheel 306 excluding terminal areas of the bound and rebound strokes, the rate of increase in the amount of compressive deformation of the compressive coil spring 184 in association with increase in the bound stroke of the wheel 306 is lower than the magnitude of the rate of decrease in the amount of compressive deformation of the compression coil spring 184 in association with increase in the rebound stroke of the wheel 306. By contrast, in the terminal areas of a bound stroke and a rebound stroke of the wheel 306, the rate of increase in the amount of compressive deformation of the compressive coil spring 184 in association with increase in the bound stroke of the wheel 306 is higher than the magnitude of the rate of decrease in the amount of compressive deformation of the compression coil spring 184 in association with increase in the rebound stroke of the wheel 306.

Thus, according to the illustrated eighth embodiment, by means of appropriately setting the shapes of the cam grooves 36 and 96 according to desired spring characteristics of the suspension, rectilinear motion and force can be transmitted from the input piston 150 to the output piston 154 in accordance with a desired continuous, nonlinear transmission characteristic over the entire ranges of a bound stroke and a rebound stroke of the wheel 306. Thus, desired progressive spring characteristics can be implemented without subjection to restrictions associated with motion of a link mechanism of the suspension.

Figure 36:
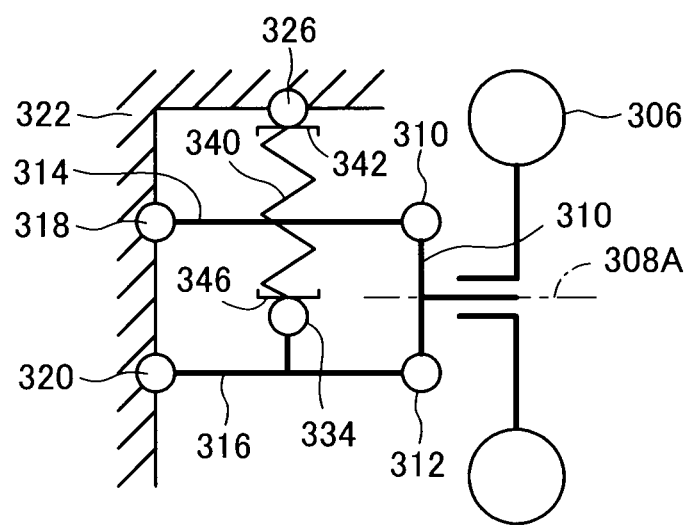
FIG. 36 is an explanatory view showing a conventional typical double-wishbone-type suspension.

FIG. 36 shows a conventional typical double-wishbone-type suspension. Members corresponding to those appearing in FIG. 31 are denoted by like reference numerals appearing in FIG. 31. In FIG. 36, a suspension spring 340 is elastically attached between an upper seat 342 fixed to the upper support 326 attached to the vehicle body 322 and a lower seat 346 fixed to a lower support 344 attached to the lower arm 316.

Figure 37:
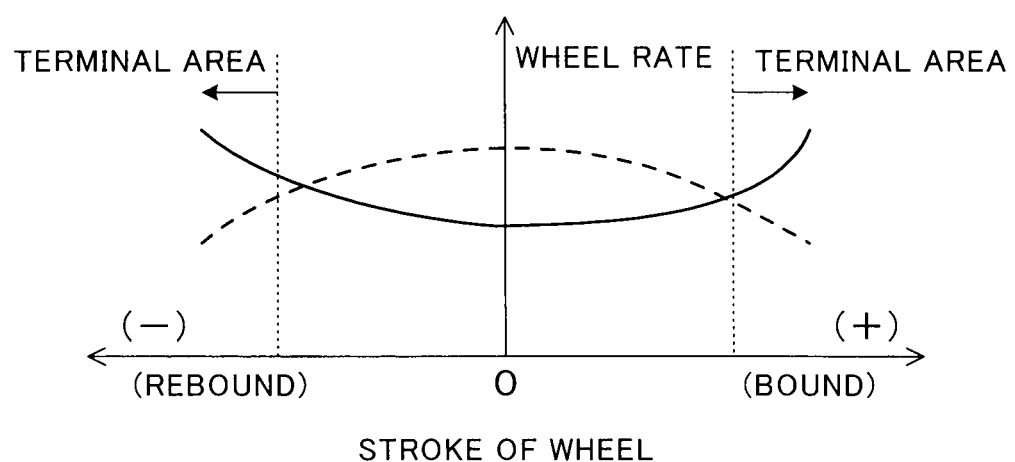
FIG. 37 is a graph showing the relation between wheel rate and bound/rebound displacement of a wheel for the eighth embodiment and a conventional typical suspension.

Since the lower arm 316 pivotally moves about its inner end in a vertical direction in association with bounds and rebounds of the wheel 306, the lower seat 346 also moves in a vertical direction along an arcuate locus about the inner end of the lower arm 316. Thus, as a bound stroke and a rebound stroke of the wheel 306 increase, the ratio of the amount of change in the amount of elastic deformation of the suspension spring 340 to the amount of increase in stroke of the wheel 306 gradually decreases. Thus, the relation between a stroke of the wheel 306 and the wheel rate (spring constant for a spring force of the suspension spring 340 which acts on the position of the wheel 306) becomes an upwardly convex relation; for example, that indicated by the broken line in FIG. 37.

According to the illustrated embodiment, as a bound stroke of the wheel 306 increases, the rate of increase in the amount of elastic deformation of the compression coil spring 184 gradually increases. Also, as a rebound stroke of the wheel 306 increases, the rate of decrease in the amount of elastic deformation of the compression coil spring 184 gradually increases. Thus, in either case of a bound stroke and a rebound stroke of the wheel 306, the wheel rate can be gradually increased with a stroke of the wheel 306. Accordingly, the relation between a stroke of the wheel 4 and the wheel rate can become a downwardly convex relation as indicated by the solid line in FIG. 37. Thus, as compared with conventional typical suspensions, while good riding comfort is ensured during ordinary running, the amount of bound and rebound of a wheel is reduced at the time of turning, acceleration and deceleration, running on a rough road, etc., thereby reducing the degree of a postural change of the vehicle body. Therefore, running stability of the vehicle can be improved.

According to the illustrated eighth embodiment, the suspension stroke transmission apparatus 148 is a suspension stroke transmission apparatus in which a shock absorber is incorporated. The input piston 150 functions as a cylinder of the shock absorber 158. Thus, as compared with a structure in which a shock absorber is not incorporated in a suspension stroke transmission apparatus, improvement can be achieved in the mountability of the suspension stroke transmission apparatus and the shock absorber in a vehicle.

According to the above-described first through eighth embodiment, the input piston 14 and the input rotor 138 each serving as an input member, the intermediate rotor 86 and the intermediate piston 140 each serving as an intermediate member, and the output piston 90 and the output rotor 142 each serving as an output member are aligned with the axis 12 and fitted to one another in such a manner as to move along the axis 12 in relation to one another. Thus, as compared with a structure in which the input member and the output member move rectilinearly along different axes and a structure in which the input member or the output member is not fitted to the intermediate member, the axial length of the motion conversion transmission apparatus can be reduced, so that the motion conversion transmission apparatus can be reliably rendered compact.

According to the above-described first through eighth embodiments, the first transmission means 54 and the second transmission means 56 are provided; the first transmission means 54 gradually increases the ratio of the amount of rotary motion of the intermediate rotor 86 to the amount of rectilinear motion along the axis 12 of the input piston 14 with the amount of rectilinear motion of the input piston 14; and the second transmission means 56 gradually increases the ratio of the amount of rectilinear motion along the axis 12 of the output piston 90 to the amount of rotary motion of the intermediate rotor 86 with the amount of rotary motion of the intermediate rotor 86. Thus, as compared with a structure in which only one of the first transmission means 54 and the second transmission means 56 gradually increases the ratio of the amount of motion of a motion transmission target member to the amount of motion of a motion transmission source member with the amount of motion of the motion transmission source member, the degree of curve of the cam grooves can be reduced, whereby the first transmission means 54 and the second transmission means 56 can smoothly conduct the conversion of motion and the transmission of a reaction force.

According to the above-described first through eighth embodiments, the first guide grooves 32 or 32A, 32B are provided for guiding the load transmission rods 30 of the first transmission means 54 along the axis 12, and the guide grooves 32 or 32B are provided for guiding the load transmission rods 90 of the second transmission means 56 along the axis 12. Thus, as compared with a structure in which the guide grooves are not provided, the rotation of the input piston 14 and the output piston 90 about the axis 12 can be reliably prevented. Therefore, the transmission of rectilinear motion and force between the input piston 14 and the output piston 90 can reliably and accurately have a desired nonlinear characteristic.

According to the above-described first through eighth embodiments, a plurality of movable members and a reaction force generation member are disposed in such a manner as to be aligned with the axis 12, and move along or about the axis 12. Thus, as compared with a structure in which the plurality of movable members and the reaction force generation member are disposed in such a manner as to be aligned with different respective axes, the structure of the stroke simulator 10 can be simplified, and the transmission of motion and reaction force can be optimally conducted.

While the present invention has been described in detail with reference to the above particular embodiment, it will be apparent to those skilled in the art that the present invention is not limited thereto, but may be embodied in various other forms without departing from the scope of the invention.

In the above-described first to third embodiments, the first transmission means 54 and the second transmission means 56 are positioned at the same circumferential position about the axis 12 and are spaced apart from each other along the axis 12. Thus, the guide grooves 32 are common to the first transmission means 54 and the second transmission means 56. However, the first transmission means 54 and the second transmission means 56 may be provided at different circumferential positions about the axis 12.

In the above-described first to sixth embodiments, the first transmission means 54 gradually increases the ratio of the amount of rotary motion of the intermediate rotor 86 to the amount of rectilinear motion along the axis 12 of the input piston 14 with the amount of rectilinear motion of the input piston 14, and the second transmission means 56 gradually increases the ratio of rectilinear motion along the axis 12 of the output piston 90 to the amount of rotary motion of the intermediate rotor 86 with the amount of rotary motion of the intermediate rotor 86. However, this may be modified as follows: only one of the first transmission means 54 and the second transmission means 56 gradually increases the ratio of the amount of motion of a motion transmission destination member to the amount of motion of a motion transmission source member with the amount of motion of the motion transmission source member.

In the above-described third embodiment, the input piston 14 and the output piston 90 are spaced apart from each other along the axis 12 at all times. However, the input piston 14 and the output piston 90 may have those portions which are located radially inside or outside of the compression coil spring 92 and are engaged with each other in such a manner as to be rectilinearly movable along the axis 12 in relation to each other as in the above-described fourth and fifth embodiments.

In the above-described fourth embodiment, the input piston 14 and the output piston 90 has the paired arm portions 14A and the paired arm portions 90A, respectively, each of the arm portions 14A and 90A having a fanwise cross section. However, each of the arm portions 14A and 90A may have an arbitrary cross section, such as a semicircular cross section. Similarly, in the above-described eighth embodiment, the input piston 14 and the output piston 90 have the recess 14B and the shaft portion 90B, respectively, each of the recess 14B and the shaft portion 90B having a circular cross section. However, the recess 14B and the shaft portion 90B may have an arbitrary cross-sectional shape. Also, the recess 14B and the shaft portion 90B may have respective plane portions which are engaged with each other in such a manner that the recess 14B and the shaft portion 90B are rectilinearly movable along the axis 12 in relation to each other and are non-rotatable about the axis 12 in relation to each other.

Only the output piston 90 of the above-described second embodiment has the orifice 110 for establishing communication between the second cylinder chamber 24 and the third cylinder chamber 106. However, an orifice similar to the orifice 110 may be provided in the output pistons 90 of the above-described first and third to fifth embodiments.

In the above-described first to fifth embodiments, the motion conversion transmission apparatus is the brake stroke simulator 10, and the output piston 90 is adapted to press the compression coil spring 92. However, each of motion conversion transmission apparatuses having structures of the first to fifth embodiments can be applied to any apparatus in which the output piston 90 transmits motion or force to another arbitrary member. Further, the treading force transmission apparatus 114 of the sixth embodiment has a structure similar to the first embodiment; however, the treading force transmission apparatus may have a structure similar to those of the second, fourth, and fifth embodiments.

In the above-described seventh embodiment, the rotary motion of the input rotor 138 is transmitted to the output rotor 142 as a rotary motion of the same direction. However, the motion conversion transmission apparatus of the present invention, which converts a rotary motion to a rectilinear motion, converts the rectilinear motion to a rotary motion, and transmits the rotary motion, may be configured to transmit a rotary motion while reversing the rotational direction by means of, for example, forming the cam grooves 36 and 96 to curve in directions opposite each other. Further, the motion conversion transmission apparatus may be applied to applications other than transmission of steering motion.

The suspension stroke transmission apparatus of the above-described eighth embodiment is a suspension stroke transmission apparatus in which a shock absorber is incorporated. However, the suspension stroke transmission apparatus may be configured such that the shock absorber is a suspension member independent of the suspension stroke transmission apparatus.

The invention claimed is:

1. A motion conversion transmission apparatus comprising:
   an input member, an intermediate member, and an output member which are fitted to one another while being aligned with an axis and move in relation to one another while being aligned with the axis;
   a first transmission which converts a first motion of the input member to a second motion and transmits the second motion to the intermediate member, the first motion being one of a rectilinear motion along the axis and a rotary motion about the axis, and the second motion being the other of the rectilinear motion along the axis and the rotary motion about the axis;
   a second transmission which converts the second motion of the intermediate member to the first motion and transmits the first motion to the output member; and
   at least one of the first transmission and the second transmission continuously and nonlinearly varies a ratio of an amount of motion of a motion transmission destination member to an amount of motion of a motion transmission source member according to the amount of motion of the motion transmission source member, wherein
   a ratio of an amount of motion of the output member to an amount of motion of the intermediate member is larger than a ratio of an amount of motion of the intermediate member to an amount of motion of the input member.

2. A motion conversion transmission apparatus according to claim 1, wherein the first transmission converts a rectilinear motion of the input member along the axis to a rotary motion about the axis, and transmits the rotary motion to the intermediate member; and the second transmission converts the rotary motion of the intermediate member about the axis to a rectilinear motion along the axis, and transmits the rectilinear motion to the output member.

3. A motion conversion transmission apparatus according to claim 2, wherein the first transmission and the second transmission are configured to rectilinearly move the output member along the axis in the same direction as that of rectilinear motion of the input member.

4. A motion conversion transmission apparatus according to claim 3, wherein, when the amount of motion of the input member is zero, the input member and the output member are in contact with each other.

5. A motion conversion transmission apparatus according to claim 2, wherein the input member and the output member have respective portions which are engaged with each other along the axis; and the first transmission and the second transmission are provided at the portion of the input member and the portion of the output member, respectively, and are separated from each other in a circumferential direction about the axis.

6. A motion conversion transmission apparatus according to claim 5, wherein the input member and the output member have respective pairs of arm portions extending along the axis toward the output member and the input member, respectively, and the paired arm portions of the input member and the paired arm portions of the output member are disposed alternately as viewed along a circumferential direction about the axis and prevent a relative rotary motion about the axis between the input member and the output member while allowing a relative rectilinear motion along the axis between the input member and the output member.

7. A motion conversion transmission apparatus according to claim 6, wherein the input member and the output member have the same shape and are disposed along the axis in an oppositely oriented relation.

8. A motion conversion transmission apparatus according to claim 2, wherein the first transmission and the second transmission are configured to rectilinearly move the output member along the axis in a direction opposite that of rectilinear motion of the input member.

9. A motion conversion transmission apparatus according to claim 2, wherein, in cooperation with other members, the output member defines on its opposite sides two cylinder chambers which are filled with liquid and whose volumes are variable; the output member has an orifice for establishing communication between the two cylinder chambers; and, in association with rectilinear motion of the output member, the liquid flows from one of the two cylinder chambers to the other cylinder chamber through the orifice.

10. A motion conversion transmission apparatus according to claim 1, wherein the first transmission converts a rotary motion of the input member about the axis to a rectilinear motion along the axis, and transmits the rectilinear motion to the intermediate member; and the second transmission converts the rectilinear motion of the intermediate member along the axis to a rotary motion about the axis, and transmits the rotary motion to the output member.

11. A motion conversion transmission apparatus according to claim 1, wherein the first transmission continuously and nonlinearly varies a ratio of an amount of motion of the intermediate member to an amount of motion of the input member according to the amount of motion of the input member; and the second transmission continuously and nonlinearly varies a ratio of an amount of motion of the output member to the amount of motion of the intermediate member according to the amount of motion of the intermediate member.

12. A motion conversion transmission apparatus according to claim 1, wherein each of the first and second transmission includes a cam provided on the motion transmission source member and a cam follower provided on the motion transmission destination member and engaged with the cam, and, by the cam follower moving to follow the cam, the ratio of the amount of motion of the motion transmission destination member to the amount of motion of the motion transmission source member is varied continuously and nonlinearly according to the amount of motion of the motion transmission source member.

13. A motion conversion transmission apparatus according to claim 12, wherein one of the cam and the cam follower is a cam groove, whereas the other of the cam and the cam follower is a cam groove engagement member which is engaged with the cam groove and moves along the cam groove, and the cam groove of at least one of the first and second transmission extends while being inclined with respect to a circumferential direction about the axis and is curved such that an angle of inclination with respect to the circumferential direction varies gradually and continuously.

14. A motion conversion transmission apparatus according to claim 13, wherein each of the cam groove engagement members has a shaft member which is fixed to a corresponding member and extends in a radial direction, and a cam roller which is rotatably supported by the shaft member and is rollably engaged with a wall surface of the corresponding cam groove.

15. A motion conversion transmission apparatus according to claim 13, wherein the cam groove of the first transmission and the cam groove of the second transmission m ns have the same angle of inclination with respect to the circumferential direction as measured at respective positions where, when the amount of motion of the input member is zero, the cam groove engagement members are engaged with the corresponding cam grooves.

16. A motion conversion transmission apparatus comprising:
an input member, an intermediate member, and an output member which are fitted to one another while being aligned with an axis and move in relation to one another while being aligned with the axis;
a first transmission which converts a first motion of the input member to a second motion and transmits the second motion to the intermediate member, the first motion being one of a rectilinear motion along the axis and a rotary motion about the axis, and the second motion being the other of the rectilinear motion along the axis and the rotary motion about the axis;
a second transmission which converts the second motion of the intermediate member to the first motion and transmits the first motion to the output member; and
at least one of the first transmission and the second transmission continuously and nonlinearly varies a ratio of an amount of motion of a motion transmission destination member to an amount of motion of a motion transmission source member according to the amount of motion of the motion transmission source member, wherein
each of the first and second transmission includes a cam provided on the motion transmission source member and a cam follower provided on the motion transmission destination member and engaged with the cam, and, by the cam follower moving to follow the cam, the ratio of the amount of motion of the motion transmission destination member to the amount of motion of the motion transmission source member is varied continuously and nonlinearly according to the amount of motion of the motion transmission source member,
one of the cam and the cam follower is a cam groove, whereas the other of the cam and the cam follower is a cam groove engagement member which is engaged with the cam groove and moves along the cam groove, and the cam groove of at least one of the first and second transmission extends while being inclined with respect to a circumferential direction about the axis and is curved such that an angle of inclination with respect to the circumferential direction varies gradually and continuously, and
the motion conversion transmission apparatus includes a housing for accommodating the input member, the intermediate member, and the output member therein; the intermediate member is fitted to the input member and the output member in such a manner as to surround the input member and the output member about the axis, and supports the input member and the output member in such a manner that the input member and the output member are rectilinearly movable along the axis; the housing is fitted to the intermediate member in such a manner as to surround the intermediate member about the axis, and supports the intermediate member in such a manner that the intermediate member is rotatable about the axis; the cam groove of the first transmission and the cam groove of the second transmission are provided on the intermediate member; the cam groove engagement member of the first transmission and the cam groove engagement member of the second transmission are provided on the input member and the output member, respectively; the housing has guide grooves extending along the axis; and the cam groove engagement member of the first transmission and the cam groove engagement member of the second transmission radially extend through the cam groove of the first transmission and the cam groove of the second transmission, respectively, and are engaged with the corresponding guide grooves in such a manner as to be movable along the guide grooves.

17. A motion conversion transmission apparatus according to claim 16, wherein the input member and the output member are spaced apart from each other along the axis at the same circumferential position about the axis, and the cam groove engagement member of the first transmission and the cam groove engagement member of the second transmission are engaged with a common guide groove.

18. A motion conversion transmission apparatus according to claim 17, wherein one of the input member and the output member has a shaft portion extending along the axis toward the other of the input member and the output member, the other member has a recess which extends along the axis and receives the shaft portion in such a manner that the shaft portion is rectilinearly movable along the axis in relation to the recess, the cam groove engagement member of the first transmission and the cam groove engagement member of the second transmission are provided at a portion around the shaft portion and the recess and are spaced apart from each other around the axis, and the portion around the recess has a slit which allows the cam groove engagement members provided at the shaft portion to move rectilinearly along the axis in relation to the portion around the recess.

19. A motion conversion transmission apparatus according to claim 17, wherein a range in which the cam groove of the first transmission extends along the axis and a range in which the cam groove of the second transmission extends along the axis overlap each other at least partially as viewed along a circumferential direction about the axis.

20. A motion conversion transmission apparatus according to claim 17, wherein the motion conversion transmission apparatus includes a housing for accommodating the input member, the intermediate member, and the output member therein; the input member and the output member are fitted to the intermediate member in such a manner as to surround the intermediate member about the axis, and supports the intermediate member in such a manner that the intermediate member is rectilinearly movable along the axis; the housing is fitted to the input member and the output member in such a manner as to surround the input member and the output member about the axis, and supports the input member and the output member in such a manner that the input member and the output member are rotatable about the axis; the cam groove of the first transmission and the cam groove of the second transmission are provided on the input member and the output member, respectively; the cam engagement member of the first transmission and the cam engagement member of the second transmission are provided on the intermediate member; the housing has guide grooves extending along the axis; and the cam groove engagement member of the first transmission and the cam groove engagement member of the second transmission radially extend through the cam groove of the first transmission and the cam groove of the second transmission, respectively, and are engaged with the corresponding guide grooves in such a manner as to be movable along the guide grooves.

21. A motion conversion transmission apparatus comprising:
- an input member, an intermediate member, and an output member which are fitted to one another while being aligned with an axis and move in relation to one another while being aligned with the axis;
- a first transmission which converts a first motion of the input member to a second motion and transmits the second motion to the intermediate member, the first motion being one of a rectilinear motion along the axis and a rotary motion about the axis, and the second motion being the other of the rectilinear motion along the axis and the rotary motion about the axis;
- a second transmission which converts the second motion of the intermediate member to the first motion and transmits the first motion to the output member; and
- at least one of the first transmission and the second transmission continuously and nonlinearly varies a ratio of an amount of motion of a motion transmission destination member to an amount of motion of a motion transmission source member according to the amount of motion of the motion transmission source member, wherein
- each of the first and second transmission includes a cam provided on the motion transmission source member and a cam follower provided on the motion transmission destination member and engaged with the cam, and, by the cam follower moving to follow the cam, the ratio of the amount of motion of the motion transmission destination member to the amount of motion of the motion transmission source member is varied continuously and nonlinearly according to the amount of motion of the motion transmission source member,
- one of the cam and the cam follower is a cam groove, whereas the other of the cam and the cam follower is a cam groove engagement member which is engaged with the cam groove and moves along the cam groove, and the cam groove of at least one of the first and second transmission extends while being inclined with respect to a circumferential direction about the axis and is curved such that an angle of inclination with respect to the circumferential direction varies gradually and continuously,
- each of the cam groove engagement members has a shaft member which is fixed to a corresponding member and extends in a radial direction, and a cam roller which is rotatably supported by the shaft member and is rollably engaged with a wall surface of the corresponding cam groove, and
- each of the cam groove engagement members has a guide roller which is rotatably supported by the shaft member and is rollably engaged with a wall surface of the corresponding guide groove extending along the direction of rectilinear motion of the input member.

* * * * *